(12) United States Patent
Kakarlapudi et al.

(10) Patent No.: US 10,062,140 B2
(45) Date of Patent: Aug. 28, 2018

(54) GRAPHICS PROCESSING SYSTEMS

(71) Applicant: ARM Limited, Cambridge (GB)

(72) Inventors: Sandeep Kakarlapudi, Trondheim (NO); Marius Bjørge, Trondheim (NO); Jan-Harald Fredriksen, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/369,778

(22) Filed: Dec. 5, 2016

(65) Prior Publication Data
US 2017/0178279 A1    Jun. 22, 2017

(30) Foreign Application Priority Data

Dec. 17, 2015   (GB) .................................. 1522262.3

(51) Int. Cl.
*G06T 1/20*       (2006.01)
*G06T 15/10*      (2011.01)
*G06T 15/80*      (2011.01)
*G06T 15/00*      (2011.01)
*H04N 13/00*      (2018.01)

(52) U.S. Cl.
CPC .............. *G06T 1/20* (2013.01); *G06T 15/005* (2013.01); *G06T 15/10* (2013.01); *G06T 15/80* (2013.01); *H04N 13/0018* (2013.01); *G06T 2210/52* (2013.01)

(58) Field of Classification Search
CPC ........... G06T 15/10; G06T 15/80; G06T 1/20; G06T 2210/52; G06T 15/005; H04N 13/0018
See application file for complete search history.

(56) References Cited

FOREIGN PATENT DOCUMENTS

| JP | 2005031878 A | 3/2005 | |
|----|---|---|---|
| WO | 2013089751 A1 | 6/2013 | |
| WO | WO 2013089751 A1 * | 6/2013 | ............. G06T 15/08 |

OTHER PUBLICATIONS

Combined Examination and Search Report dated Mar. 30, 2016 in Great Britain Patent Application No. GB1522262.3; 7 pages.
English Abstract of JP2005031878A, published Mar. 2, 2005; 1 page.

* cited by examiner

*Primary Examiner* — Robert Craddock
(74) *Attorney, Agent, or Firm* — Vierra Magen Marcus LLP

(57) ABSTRACT

In a graphics processing system, when rendering plural views of the same scene (step 43), such as for stereoscopic rendering, the vertex shading operation is configured so that rather than executing the vertex shader program separately for each view that is being rendered, a single vertex shading program is executed once for all the views. The vertex shader program that is executed is configured to, for view-dependent operations, perform the respective operation separately for each view (step 48), so as to derive an appropriate vertex shaded output attribute value for each view, and is configured to, for vertex shading operations that are not dependent upon the view being rendered, perform those vertex shading operations only once for the set of views and to provide only a single vertex shaded output value for each vertex attribute in question for the set of views (step 49).

25 Claims, 4 Drawing Sheets

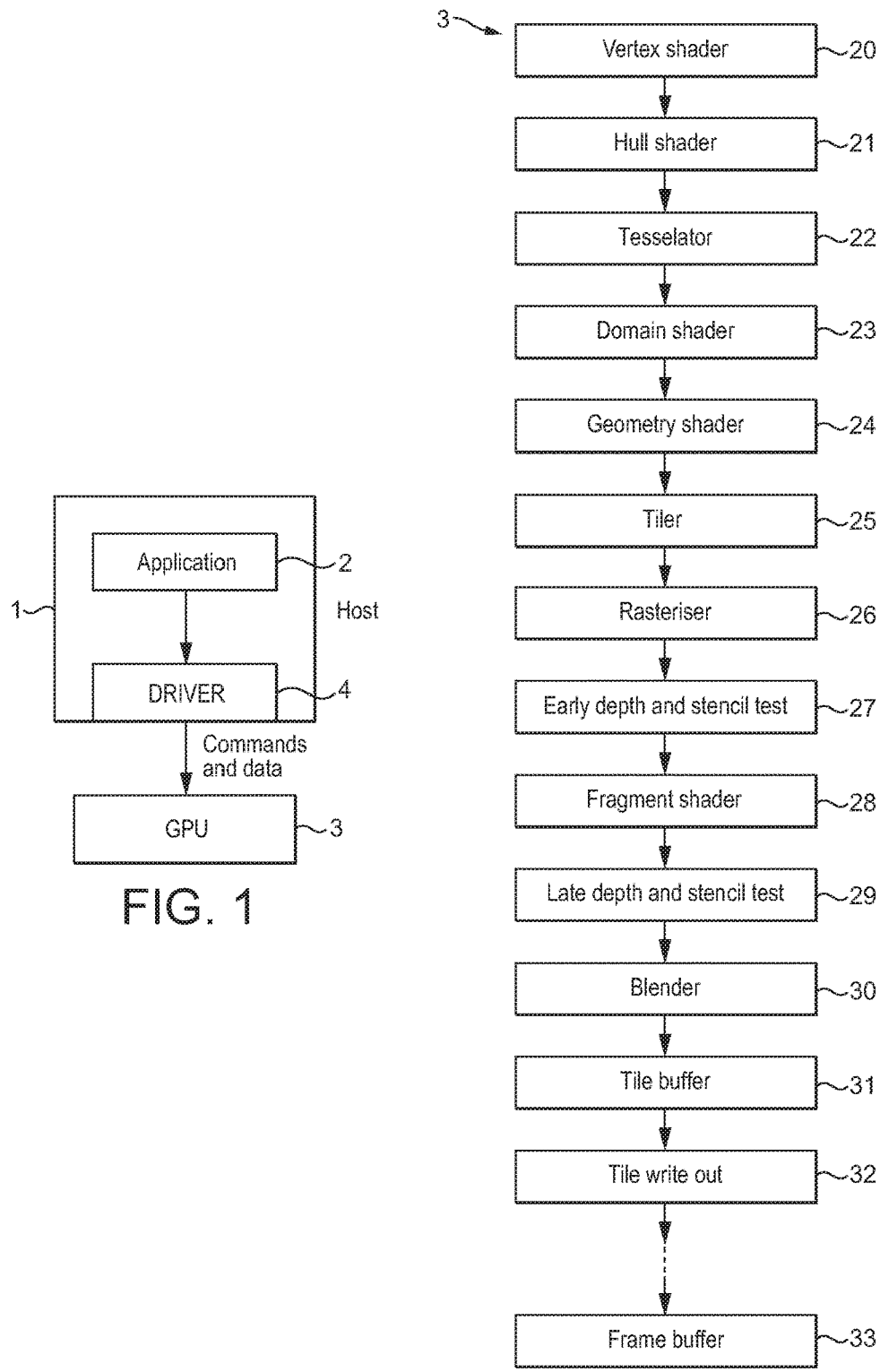

GRAPHICS PROCESSING SYSTEMS

BACKGROUND

The technology described herein relates to graphics processing systems that include one or more programmable processing stages ("shaders"), and in particular to the operation of such graphics processing systems when performing "multiview" rendering.

Graphics processing is typically carried out in a pipelined fashion, with one or more pipeline stages operating on the data to generate the final render output, e.g. frame that is displayed. Many graphics processing pipelines now include one or more so-called "shading" stages, commonly referred to as "shaders". For example, a graphics processing pipeline may include one or more of, and typically all of, a geometry shader, a hull shader, a domain shader, a vertex shader and a fragment (pixel) shader. These shaders are processing stages that execute shader programs on input data values to generate a desired set of output data (e.g. appropriately transformed and lit vertex data in the case of a vertex shader) for processing by the rest of the graphics processing pipeline and/or for output. The shading operations normally operate on so-called "attributes". An attribute is an input or output variable in a shader program and may represent for example, position, colour or texture coordinate, etc.

A graphics "shader" thus performs graphics processing by running small programs for each work item in an output to be generated, such as a render target, e.g. frame (a "work item" in this regard is usually a vertex (in the case of a vertex shader) or a pixel or sampling position (e.g. in the case of a fragment shader), but it may also be a compute shader work item where the graphics processing pipeline is being used to perform compute shading operations (e.g. in accordance with OpenCL or DirectCompute)).

In graphics shader operation, each work item will be processed by means of an execution thread which will execute the shader program in question for the work item in question. Modern graphics processing units (graphics processors) accordingly typically comprise programmable processing circuitry, e.g. in the form of one or more programmable execution units, that can execute shader programs to perform graphics processing operations. A given shader program to be executed by the programmable processing circuitry (execution unit) will comprise a sequence of instructions, and the programmable processing circuitry (execution unit) will execute the instructions in the sequence appropriately for each execution thread (and work item) that the shader program is to be executed for.

A shader program to be executed by a given "shader" stage of a graphics processing pipeline will be provided by the application that requires the graphics processing using a high-level shader programming language, such as GLSL, HLSL, OpenCL, etc. The high-level shader program is then translated by the shader language compiler to binary code for the target graphics processing pipeline. This binary code will consist of "instructions" which are specified in the instruction set specification for the given target graphics processing pipeline.

It is becoming increasingly common for graphics processing systems to be required to perform so-called "multiview" rendering. In this case, plural different views of a given scene are rendered, e.g. from plural different viewpoints, so as to create a set of images of the scene, with each image, e.g., viewing the scene from a different viewpoint. An example of this is stereoscopic rendering in which two images of a scene, one corresponding to the scene as seen from the left eye, and one corresponding to the scene as seen from the right eye, are generated and then displayed appropriately so as to provide a three-dimensional effect when the images are viewed. It is also known to generate and provide more than two views of a scene, for example for a lenticular display (which can, for example, use four or more images offset from each other).

When generating the multiple views required, typically the image corresponding to each respective view is generated separately and then the images displayed appropriately to achieve the desired, e.g., 3D, effect.

The Applicants believe that there remains scope for improvements to the generation of multiple images corresponding to multiple different views of the same scene when performing multiview rendering in graphics processing systems.

BRIEF DESCRIPTION OF THE DRAWINGS

A number of embodiments of the technology described herein will now be described by way of example only and with reference to the accompanying drawings, in which:

FIG. 1 shows an exemplary computer graphics processing system;

FIG. 2 shows schematically a graphics processing pipeline that can be operated in the manner of the technology described herein;

Like reference numerals are used for like components where appropriate in the drawings.

DETAILED DESCRIPTION

Figure 3:
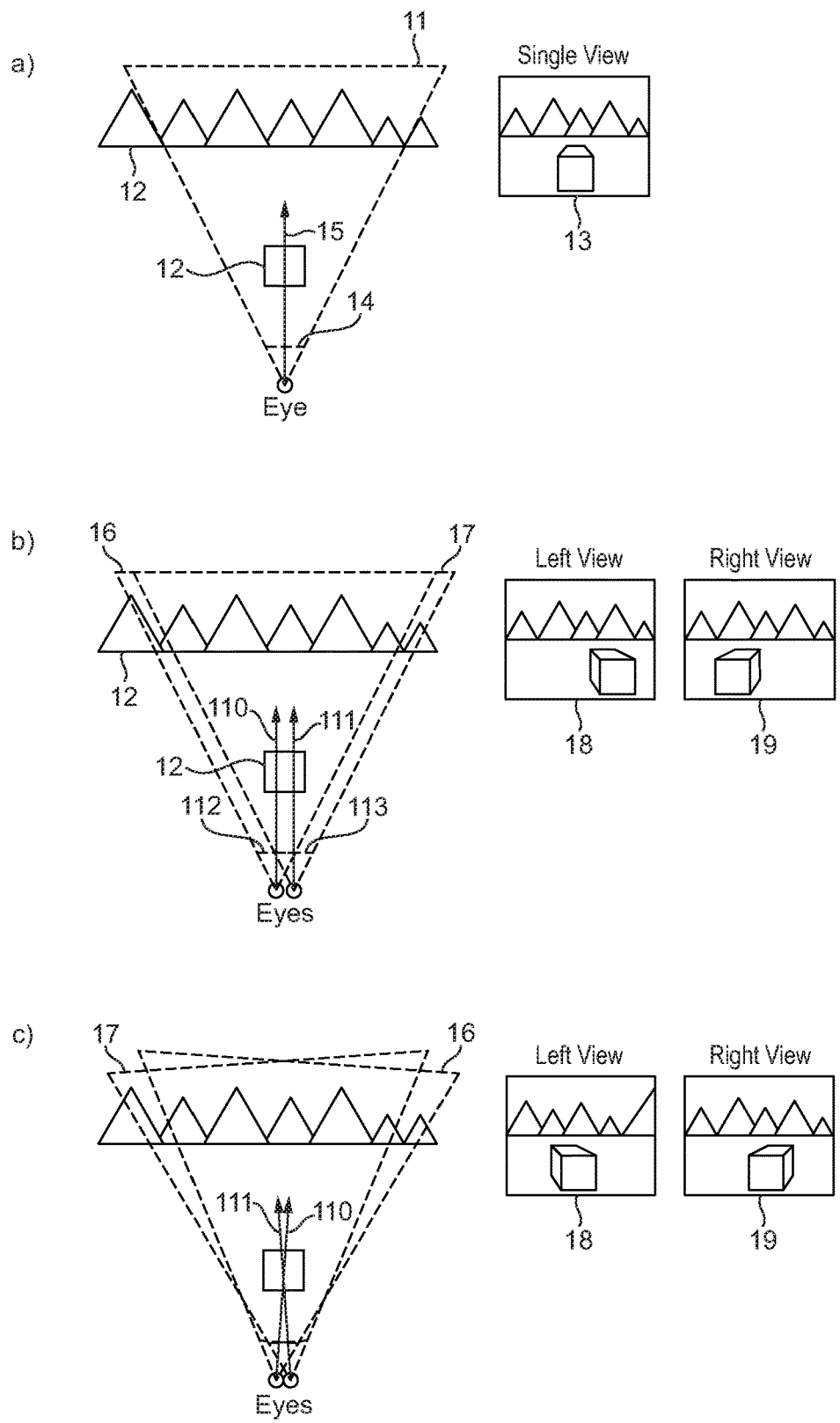
FIG. 3 illustrates stereoscopic rendering.

A first embodiment of the technology described herein comprises a method of operating a graphics processing system, the graphics processing system including:

a graphics processing pipeline comprising a programmable vertex shading stage that executes vertex shader programs to perform vertex shading operations for vertices to be used when generating an output of the graphics processing pipeline;

and processing circuitry that is operable to convert a vertex shader program provided for execution by the vertex shading stage of the graphics processing pipeline to a vertex shader program to be executed by the vertex shading stage of the graphics processing pipeline;

the method comprising:

the processing circuitry:

determining for a vertex shader program provided for execution by the vertex shading stage of the graphics processing pipeline whether the vertex shader program relates to performing multi-view rendering to render a set of plural images representing plural different views of the same scene;

and, when it is determined that the vertex shader program relates to performing multi-view rendering to render a set of plural images representing plural different views of the same scene:

determining whether the vertex shader program includes a vertex shading operation that can be performed only once for the set of plural views of the scene that are being rendered; and when it is determined that the vertex shader program
   includes a vertex shading operation that can be per-
   formed only once for the set of plural views of the
   scene that are being rendered, including in a vertex
   shader program to be executed by the programmable
   vertex shading stage of the graphics processing pipe-
   line, a sequence of at least one graphics program
   instruction that when executed will cause the vertex
   shading stage of the graphics processing pipeline to
   perform that vertex shading operation for a vertex once
   for the set of plural views of the scene that are being
   rendered and to provide only a single output value for
   a vertex for that vertex shading operation for the set of
   views;
and
determining whether the vertex shader program includes
   a vertex shading operation that should be performed
   separately for each view of the set of plural views of the
   scene that are being rendered; and
when it is determined that the vertex shader program
   includes a vertex shading operation that should be
   performed separately for each view of the set of plural
   views of the scene that are being rendered, including in
   the vertex shader program to be executed by the
   programmable vertex shading stage of the graphics
   processing pipeline, a sequence of at least one graphics
   program instruction that when executed will cause the
   vertex shading stage of the graphics processing pipeline
   to perform that vertex shading operation for a vertex
   separately for each view of the set of plural views of the
   scene that are being rendered, so as to provide a
   separate output value for a vertex for that vertex
   shading operation for each view of the set of views;
the method further comprising:
providing the vertex shader program to the graphics
processing pipeline for execution; and
the programmable vertex shading stage of the graphics
processing pipeline when it is to perform vertex shading
operations for vertices to be processed for the set of plural
views to be rendered, executing the vertex shader program
once for each vertex to be processed;
wherein the executing the vertex shader program for a
vertex comprises, in response to the instructions in the
vertex shader program:
   when the vertex shader program provided to the graphics
processing pipeline for execution comprises a sequence of at
least one graphics program instruction that when executed
will cause the vertex shading stage of the graphics process-
ing pipeline to perform a vertex shading operation for a
vertex once for the set of plural views of the scene that are
being rendered and to provide only a single output value for
a vertex for that vertex shading operation for the set of
views, performing that vertex shading operation for the
vertex once for the set of plural views of the scene that are
being rendered and providing only a single output value for
the vertex for that vertex shading operation for the set of
views;
   and
   when the vertex shader program provided to the graphics
processing pipeline for execution comprises a sequence of at
least one graphics program instruction that when executed
will cause the vertex shading stage of the graphics process-
ing pipeline to perform a vertex shading operation for a
vertex separately for each view of the set of plural views of
the scene that are being rendered, so as to provide a separate
output value for a vertex for that vertex shading operation
for each view of the set of views, performing that vertex
shading operation for the vertex separately for each view of
the set of plural views, so as to provide a separate output
value for that vertex shading operation for the vertex for
each view of the set of plural views that are being rendered.

A second embodiment of the technology described herein
comprises a graphics processing system comprising:
   a graphics processing pipeline comprising a program-
mable vertex shading stage that executes vertex shader
programs to perform vertex shading operations for vertices
to be used when generating an output of the graphics
processing pipeline;
   the graphics processing system further comprising:
   processing circuitry that is operable to convert a vertex
shader program provided for execution by the vertex shad-
ing stage of the graphics processing pipeline to a vertex
shader program to be executed by the vertex shading stage
of the graphics processing pipeline;
   wherein the processing circuitry is configured to:
   determine for a vertex shader program provided for
execution by the vertex shading stage of the graphics
processing pipeline, whether the vertex shader program
relates to performing multi-view rendering to render a set of
plural images representing plural different views of the same
scene;
   and to, when it is determined that the vertex shader
program relates to performing multi-view rendering to ren-
der a set of plural images representing plural different views
of the same scene:
   determine whether the vertex shader program includes a
      vertex shading operation that can be performed only
      once for the set of plural views of the scene that are
      being rendered; and
   when it is determined that the vertex shader program
      includes a vertex shading operation that can be per-
      formed only once for the set of plural views of the
      scene that are being rendered, include in a vertex shader
      program to be executed by the programmable vertex
      shading stage of the graphics processing pipeline, a
      sequence of at least one graphics program instruction
      that when executed will cause the vertex shading stage
      of the graphics processing pipeline to perform that
      vertex shading operation for a vertex once for the set of
      plural views of the scene that are being rendered and to
      provide only a single output value for a vertex for that
      vertex shading operation for the set of views;
   and
   determine whether the vertex shader program includes a
      vertex shading operation that should be performed
      separately for each view of the set of plural views of the
      scene that are being rendered; and
   when it is determined that the vertex shader program
      includes a vertex shading operation that should be
      performed separately for each view of the set of plural
      views of the scene that are being rendered, include in
      a vertex shader program to be executed by the pro-
      grammable vertex shading stage of the graphics pro-
      cessing pipeline, a sequence of at least one graphics
      program instruction that when executed will cause the
      vertex shading stage of the graphics processing pipeline
      to perform that vertex shading operation for a vertex
      separately for each view of the set of plural views of the
      scene that are being rendered, so as to provide a
      separate output value for a vertex for that vertex
      shading operation for each view of the set of views;
the graphics processing system further comprising pro-
cessing circuitry configured to:

cause the programmable vertex shading stage of the graphics processing pipeline to execute the vertex shader program once for a set of plural views to be rendered for each vertex to be processed for the set of plural views.

The technology described herein relates to arrangements in which multiple views of the same scene are to be rendered.

In the technology described herein, when it is recognised that multi-view rendering is to be performed, it is determined whether the vertex shader program contains any operations that can be performed only once for the set of views being rendered (e.g., and in an embodiment, that are view-independent), and whether there are any vertex shading operations that should be performed separately for each view (e.g., and in an embodiment, that are view-dependent).

A single vertex shader program is then prepared for execution by the vertex shader of the graphics processing pipeline that is configured to cause the vertex shader to perform the operations that can be performed only once for the set of plural views being rendered only once, and to produce (only) a single output for those operations, for the set of views, and to cause the vertex shader to perform the operations that should be performed separately for each view separately for each view of the scene, so as to produce a result for those operations separately for each view of the scene.

This has the effect that in the technology described herein, rather than performing the vertex shading for each view (image) of the scene to be generated separately, the vertices for the scene are vertex shaded only once, but the vertex shading program (and thus operation) is configured to cause the vertex shader to for some vertex shading operations perform those operations and produce a result separately for each view of the scene that is required, but for other vertex shading operations to perform those operations only once and to produce only a single output for the set of views. This then has the effect that some vertex shading operations will be performed "per view", whereas other vertex shading operations will only be performed once for the complete set of views.

The Applicants have recognised in this regard that when performing multiview rendering, there may be some vertex shading attributes (variables) and operations that will vary (will (potentially) produce different results) for different views of the scene (i.e. that will be "view dependent"), but there may also be other vertex shading attributes (variables) and operations that will be the same for (and produce the same result for) each view (i.e. that will, in effect, be "view independent"). The technology described herein exploits this, by configuring the vertex shading program that is executed by the programmable vertex shading stage of the graphics processing pipeline in response to an application vertex shading program for "multi-view" rendering to perform some vertex shading operations (e.g., and in an embodiment, those operations that are view dependent) once per view, but other vertex shading programs (e.g., and in an embodiment, those vertex shading operations that are view independent) only once for the set of plural views that are being rendered.

The vertex shader processing is made even more efficient in the technology described herein by generating, and having the vertex shader execute, a single vertex shading program to be executed for each vertex that performs all the necessary vertex shading operations for all the views. This then avoids, e.g., the need to spawn and execute separate execution threads for a vertex for each view.

Thus in the technology described herein the vertex input attributes may, e.g., be read only once, thereby reducing read bandwidth and load instructions, and any view-independent vertex operations may be performed only once in the vertex shader (this encompasses load/store, arithmetic, and texturing operations, for example), and any view independent vertex shader output attributes may be written out and stored only once. Thus the computation and bandwidth for performing the vertex shading operations for all the views may be reduced, thereby, e.g., reducing power consumption, e.g. as compared, for example, to arrangements in which vertex shading is performed separately for each view of a set of plural views of a scene to be rendered (e.g. by spawning and executing an execution thread and vertex shader program separately for a vertex for each view).

The programmable vertex shading stage (vertex shader) may be configured and implemented as desired, and may comprise any suitable programmable hardware circuits, such as programmable processing circuitry. It may be provided as a separate circuit element (circuitry) or it may be at least partially formed of shared programmable graphics processing circuitry.

In an embodiment, the graphics processing pipeline (processor) comprises a programmable execution unit that is operable to execute graphics shading programs to perform graphics processing operations that functions, inter alia, as the programmable vertex shading stage. (The programmable execution unit may act solely as the vertex shading stage, or it may also act as other shading stages of the graphics processing pipeline, e.g. by executing different (and appropriate) graphics shading programs.)

The number of views of the scene that are to be rendered can be selected as desired. In one embodiment there are two views of the scene being rendered. This will be appropriate for stereoscopic rendering, for example. In other embodiments more than two views of the scene are rendered.

The different views of the scene that are rendered can be selected as desired. The different views may, e.g., comprise views of the scene from different viewpoints, but could also comprise views that are from the same viewpoint but differ from each other in some other way (e.g. have a different field of view and/or scaling factor). The latter case would allow parts of the same view to be rendered at higher resolution, for example.

In an embodiment, the plural different views of the scene are from plural different viewpoints, i.e. a set of plural images representing the same scene from plural different viewpoints is rendered. In this case, the different viewpoints that each view of the scene is rendered for (with respect to) can be selected as desired. For example, in the case of stereoscopic rendering, the different viewpoints for the views representing the scene can, and in an embodiment do, correspond to a "left eye" viewpoint and a "right eye" viewpoint.

It would also be possible for the set of plural different views of the scene to, for example, include both views from different viewpoints, and views from the same viewpoint but which differ in some other way.

Other arrangements would, of course, be possible.

The vertex shader program that is provided to the programmable vertex shading stage and that the programmable vertex shading stage executes should, and in an embodiment does, comprise a set of graphics program instructions that are to be executed to perform the desired vertex shading processes and operations.

The vertex shading operation(s) that are performed only once for the set of plural views can be any suitable and desired vertex shading operation(s). They are in an embodiment vertex shading operations that are, and that relate to attributes (variables) that are view independent, such as matrix skinning, vertex texturing, position shading (at least in the case of using parallel view frustums for the different views), and texture coordinates.

It would also be possible for the vertex shading operation(s) that are performed only once for the set of plural views to comprise operations that relate to part (but not all) of the processing for a given vertex attribute, for example, if desired and where appropriate. For example, where the transformed position attributes for vertices (e.g. x, y, z, w) are determined once and then respective x offsets determined, e.g. based on the eye distance, for each view, the determination of the "base" x, y, z, w values would be view independent and so could be performed (only) once, but with an x offset then being determined for each view (e.g. based on the eye distance).

Similarly, where operations such as perspective divide and viewpoint transformation are performed (at least in part) by executing a vertex shader program, then again any aspect of those calculations that are view-independent can be configured to be performed only once for the set of plural views if desired.

For these vertex shading operations and/or vertex attributes, the vertex shader program that is provided to the graphics processing pipeline for execution will, when executed, generate and produce (only) a single output value (output attribute value) for the set of plural views that are being rendered.

The vertex shader program can be configured to cause the vertex shading stage (when it executes the vertex shader program) to perform the vertex shading operations for a vertex once (and only once) for the set of plural views of the scene that are being rendered and to provide only a single output value for those vertex shading operations for the set of views in any appropriate and desired manner. In an embodiment a single set of instructions for performing those vertex shading operations is included in the vertex shader program that is provided to and executed by the programmable vertex shading stage.

The vertex shading operations that are performed separately for each view can correspondingly comprise any suitable and desired vertex shading operations (and relate to any suitable and desired vertex attributes) for which a different output for each view may be appropriate and/or desirable. These operations and vertex attributes are in an embodiment vertex shading operations and attributes for which it is not certain (guaranteed) that the same result would be produced for each view, and thus they in an embodiment correspond to vertex shading operations and vertex attributes that are view dependent, such as transformed vertex positions (either in part or completely), view vector(s), reflection vector(s), etc.

This may depend on how the processing for the scene that is being rendered is to be performed. For example, if lighting calculations are to be performed in view space (as opposed to world space), then the normal, and tangent/binormal calculations will be view-dependent and so should be and are in an embodiment determined separately for each view.

For these vertex shading operations and/or attributes, the vertex shading operations will be performed (and an output value generated) once for each view of the set of plural views of the scene that are being rendered. Thus where there are N views of the scene being rendered, these vertex shading operations will be performed by the vertex shader N times for a given vertex, and N output values, one for each view, will be generated and provided for the vertex in question.

The vertex shader program can be configured to cause the vertex shading stage (when it executes the vertex shader program) to perform a vertex shading operation for a vertex once (separately) for each view of the set of plural views of the scene that are being rendered (and to provide a separate output value for the vertex shading operation for each view of the set of views) in any appropriate and desired manner. In an embodiment the set of instructions for performing the vertex shading operation in question is included in the vertex shader program that is provided to and executed by the programmable vertex shading stage multiple times, once for each view (for which the operation is to be performed and an output value generated).

Thus, the set of instructions for performing the vertex shading operation in question is in an embodiment repeated plural times in the vertex shader program that is provided to the graphics processing pipeline for execution, once for each view (and thus will be repeated N times, where N views of the scene are to be rendered). In this case, each set of the set of instructions for performing the vertex shading operation in the vertex shader is in an embodiment configured, if necessary, and as appropriate, to perform the operation for one of the views (and for the view in question). Thus each respective set of the set of instructions for the vertex shading operation may have its e.g., and in an embodiment, load and store instructions appropriately configured so as to load the appropriate input values for the view in question, and to store its output value or values appropriately (and separately) for the view in question.

The graphics processing system includes processing circuitry that is operable to convert a vertex shader program provided for execution by the vertex shading stage of the graphics processing pipeline to a vertex shader program to be executed by the vertex shading stage of the graphics processing pipeline. Typically (and in an embodiment this is the case), the vertex shader program that is provided for execution by the vertex shading stage of the graphics processing pipeline will be provided in a first programming language that is not suitable for (direct) execution by the vertex shading stage of the graphics processing pipeline, and the processing circuitry will convert that program to a format suitable for execution by the vertex shading stage of the graphics processing pipeline.

In such operation, the first programming language that the processing circuitry receives and converts to the program for execution by the vertex shading stage of the graphics processing pipeline can comprise any appropriate and desired higher level representation of the vertex shader program (i.e. that is not in a format suitable for execution by the vertex shading stage of the graphics processing pipeline). Thus the first programming language format that the vertex shader program is provided in could comprise the vertex shader program in a high level shader programming language that is provided by an application that requires graphics processing, or it could comprise an intermediate representation (an intermediate language representation) of the vertex shader program (e.g., and in an embodiment, of the high level shader program provided by the application). The latter may be particularly applicable where an "intermediate representation" of the high level shader code may be used and provided, e.g. for compilation purposes.

Thus, in an embodiment, the vertex shader program that the processing circuitry converts to a vertex shader program to be executed by the vertex shading stage of the graphics processing pipeline (and analyses to determine whether the vertex shader program relates to performing multiview rendering and/or includes vertex shading operations that can be performed only once for the set of plural views of the scene that are being rendered or that should be performed separately for each view of the set of plural views of the scene that are being rendered) comprises one of:

a vertex shader program provided in a high-level shader programming language by an application that requires graphics processing; and an intermediate representation of a vertex shader program provided in a high-level shader programming language by an application that requires graphics processing.

The application that provides the shader program code for the multi-view rendering can be any desired and suitable application that can require graphics processing, e.g., that is executing on a host processor of the graphics processing system.

The processing circuitry that is operable to convert a vertex shader program provided for execution by the vertex shading stage of the graphics processing pipeline (e.g. in a first programming language) to a vertex shader program to be executed by the vertex shader stage of the graphics processing pipeline (and that then determines whether multi-view rendering is being performed and configures the vertex shader program provided to the graphics processing pipeline for execution accordingly) can comprise any suitable and desired processing circuitry of the graphics processing system.

This processing circuitry is in an embodiment programmable processing circuitry that can be programmed to operate in the manner required. In an embodiment, this processing circuitry is part of (and thus these operations are performed on) a host processor of the graphics processing system. Thus, in an embodiment, the processing circuitry comprises appropriate processing circuitry, e.g. a CPU, of a host processor of the graphics processing system.

In an embodiment, the conversion of the vertex shader program provided for execution by the vertex shading stage of the graphics processing pipeline (e.g. in a first programming language) to a vertex shader program to be executed by the vertex shading stage of the graphics processing pipeline, and the determination of whether multi-view rendering is being performed (and the provision of a vertex shader program to be executed by the graphics processing pipeline in the manner of the technology described herein accordingly) is performed by a compiler of the graphics processing system (and for the graphics processing pipeline).

Thus, in an embodiment, the compiler for the shader in question performs these operations. Thus, in an embodiment the shader compiler for the graphics processing pipeline performs these operations and/or the respective vertex shader compiler performs these operations, as appropriate (where there are distinct compilers).

Thus, in an embodiment, the processing circuitry that determines (recognises) when the graphics processing pipeline is to render a set of plural images representing plural different views of the same scene comprises compiler processing circuitry (a compiler) of the graphics processing system.

The compiler may, e.g., execute on the host processor of the graphics processing system (and in an embodiment does execute on the host processor of the graphics processing system), e.g., and in an embodiment, that the application that is requesting the graphics processing executes on, e.g., and in an embodiment, as part of a driver for the graphics processing pipeline that executes on the host processor. Other arrangements would be possible, if desired.

It can be recognised (determined) when the graphics processing pipeline is to render a set of plural images representing plural different views of the same scene (is to perform multi-view rendering) (when the shader program relates to performing multi-view rendering) in any suitable and desired manner.

The fact that the graphics processing pipeline is to render a set of plural images representing plural different views of the same scene (is to perform multi-view rendering) may be, and in an embodiment is, determined from information, such as state information and/or metadata, associated with the graphics processing tasks or tasks that is being provided by the application, e.g. and in an embodiment, that indicates that multi-view rendering is required. For example, the application may provide an indication, when it requests the graphics processing operations, that multi-view rendering is being performed.

For example, the vertex shading program provided for execution by the vertex shading stage of the graphics processing pipeline may include a function call to indicate that multi-view rendering is required. For example, in the case of the OpenGL API, this could be recognised through use of the OVR_multi-view extension for OpenGL/OpenGL ES. The use of this extension could be recognised, e.g., by the compiler, to indicate that multi-view rendering is required. Corresponding arrangements could be used for other graphics APIs (application programming interfaces).

Other arrangements would, of course, be possible. For example, it could be recognised that the graphics processing tasks in question will produce multiple frame buffers, and/or that the shader program uses a particular variable or variables, such as a view identifier (ViewID), that is indicative of multi-view rendering.

Thus, in an embodiment, the shader program code is analysed to determine and recognise whether multi-view rendering is being performed. This analysis can be done on the shader program code at any suitable and desired level of representation of the shader program code (at any desired and suitable level of the shader program expression and compilation process).

Thus it could, for example, be done on the shader program code in the form that it is provided to the processing circuitry (e.g. compiler). Thus, in one embodiment, shader program code that is provided in a first programming language is analysed to determine and recognise whether multi-view rendering is being performed. In this case, the shader program in, e.g., a higher level language that is provided by the application that requires the graphics processing, or in the form of an intermediate representation of that high level shader code, would be analysed to determine and recognise whether multi-view rendering is being performed.

However, it would also be possible to analyse the shader code in the form that is suitable for execution by the vertex shading stage of the graphics processing pipeline to determine and recognise whether multi-view rendering is being performed, if desired (and in another embodiment, this is what is done). In this case, the target binary code for the graphics processing pipeline, e.g., would be analysed to determine and recognise whether multi-view rendering is being performed.

The configuration of the vertex shader (vertex shading program) that is provided to the graphics processing pipeline for execution for the vertex shading operation in the manner of the technology described herein when it is recognised that the graphics processing pipeline is to render a set of plural images representing plural different views of the same scene (is to perform multi-view rendering) can correspondingly be achieved in any suitable and desired manner.

In an embodiment, the shader program code is analysed, and then an appropriate vertex shader program in the form of the technology described herein is derived therefrom for provision to (and execution by) the graphics processing pipeline (to (and by) the vertex shader of the graphics processing pipeline).

Again, this analysis can be performed on the shader code in any suitable and desired format (and at any suitable and desired level of representation of the shader program). Thus it may be performed on the shader program code in the first programming language that is provided for the, e.g., compilation, process (thus in the high level language that is provided by the application that requires graphics processing, or an intermediate representation of that high level shader code), and/or it could be performed on the shader program in the form that it is to be provided in to the graphics processing pipeline for execution (e.g. in the target binary code for the graphics processing pipeline).

As discussed above, in an embodiment, the compiler for the shader in question performs this operation. Thus, in an embodiment the shader compiler for the graphics processing pipeline performs this operation and/or the respective vertex shader compiler performs this operation, as appropriate (where there are distinct compilers).

Thus, in an embodiment, the processing circuitry that configures the vertex shader program appropriately comprises compiler processing circuitry (a compiler) of the graphics processing system.

Thus, in an embodiment, the system, e.g. compiler, is operable to identify in the vertex shader (vertex shading program) (e.g. supplied in a first programming language) (e.g. that has been defined for the graphics processing output in question) any vertex shader operations that can be executed (performed) only once for the set of plural views of the scene that are being rendered, and those vertex shader operations that should be performed once for each view, and when such vertex shading operations are identified, to include appropriate instructions for executing those instructions either (only) once for the set of plural views, or individually for each view (as appropriate), in the vertex shader program that is provided to the graphics processing pipeline for execution.

A vertex shading operation can be identified as being able to be performed only once for the set of plural views, or as needing to be performed separately for each view of the set of plural views that is being rendered, in any suitable and desired manner.

In an embodiment this is determined from information such as state information, a variable or variables, and/or metadata, associated with the vertex shader program code, that identifies a given vertex shading operation as being able to be performed only once for the set of views or needing to be performed separately for each view. Such information in an embodiment comprises an indication that the vertex shader operation (e.g. that the vertex attribute that the operation relates to) is view-dependent or not.

For example, a given vertex shading operation and/or vertex attribute may have a "view identifier" associated with it in the shader program code, e.g. to identify which view that set of instructions in the program code relates to. The fact that a vertex shader operation and/or vertex attribute is associated with a view identifier in the shader program code, and is in an embodiment, used to identify those vertex shader operations and attributes that need to be processed separately for each view, with the system, e.g. compiler, then including appropriately repeated sets of instructions for that operation, once for each view, in the vertex shader program that is provided to the graphics processing pipeline for execution.

Correspondingly, where a vertex shading operation and/or vertex attribute does not have any view identifier associated with it in the shader program code, then the system, e.g. compiler, can use that information to determine and recognise that that vertex shading operation and/or attribute can be performed and/or processed only once for the set of plural views of the scene that are being rendered (with the program code that is then provided to the graphics processing pipeline for execution accordingly only comprising a single set of instructions for executing that vertex shading operation).

Other arrangements for determining whether a given vertex shading operation and vertex attributes can be processed only once for the set of plural views or should be processed separately for each view can of course be used, if desired.

The system, e.g. compiler, should, and in an embodiment does, also configure the instructions that it includes in the program code for execution by the graphics processing pipeline for the vertex shading operations in question appropriately. Thus, for example, for view-dependent operations and attributes, each respective set of those instructions (i.e. that are to perform the operation for a given view) should be and is in an embodiment configured to load the appropriate input values for the view in question, and to output the result appropriately, e.g. to the appropriate storage, for the view in question.

The technology described herein also extends to the compiler and to the compiler operation itself.

Thus, another embodiment of the technology described herein comprises a method of compiling a program to generate instructions for a programmable vertex shading stage of a graphics processing pipeline that executes vertex shader programs to perform vertex shading operations;

the method comprising:

for a vertex shader program to be executed by a vertex shading stage of a graphics processing pipeline when a set of plural images representing plural different views of the same scene is to be rendered:

determining whether the vertex shader program includes a vertex shading operation that can be performed only once for the set of plural views of the scene that are being rendered; and when it is determined that the vertex shader program includes a vertex shading operation that can be performed only once for the set of plural views of the scene that are being rendered, including in a vertex shader program to be executed by a programmable vertex shading stage of a graphics processing pipeline, a sequence of at least one graphics program instruction that when executed will cause the vertex shading stage of the graphics processing pipeline to perform that vertex shading operation for a vertex once for the set of plural views of the scene that are being rendered and to provide only a single output value for a vertex for that vertex shading operation for the set of views;

and determining whether the vertex shader program includes a vertex shading operation that should be performed separately for each view of the set of plural views of the scene that are being rendered; and when it is determined that the vertex shader program includes a vertex shading operation that should be performed separately for each view of the set of plural views of the scene that are being rendered, including in a vertex shader program to be executed by a programmable vertex shading stage of a graphics processing pipeline, a sequence of at least one graphics program instruction that when executed will cause the vertex shading stage of the graphics processing pipeline to perform that vertex shading operation for a vertex separately for each view of the set of plural views of the scene that are being rendered, so as to provide a separate output value for a vertex for that vertex shading operation for each view of the set of views.

Another embodiment of the technology described herein comprises a compiler that compiles programs to generate instructions for a vertex shading stage of a graphics processing pipeline that executes instructions to perform vertex shading operations;

wherein the compiler is configured to:

for a vertex shading program to be executed by a vertex shading stage of a graphics processing pipeline when a set of plural images representing plural different views of the same scene is to be rendered:

determine whether the vertex shader program includes a vertex shading operation that can be performed only once for the set of plural views of the scene that are being rendered; and when it is determined that the vertex shader program includes a vertex shading operation that can be performed only once for the set of plural views of the scene that are being rendered, include in a vertex shader program to be executed by a programmable vertex shading stage of a graphics processing pipeline, a sequence of at least one graphics program instruction that when executed will cause the vertex shading stage of the graphics processing pipeline to perform that vertex shading operation for a vertex once for the set of plural views of the scene that are being rendered and to provide only a single output value for a vertex for that vertex shading operation for the set of views;

and determine whether the vertex shader program includes a vertex shading operation that should be performed separately for each view of the set of plural views of the scene that are being rendered; and when it is determined that the vertex shader program includes a vertex shading operation that should be performed separately for each view of the set of plural views of the scene that are being rendered, include in a vertex shader program to be executed by a programmable vertex shading stage of a graphics processing pipeline, a sequence of at least one graphics program instruction that when executed will cause the vertex shading stage of the graphics processing pipeline to perform that vertex shading operation for a vertex separately for each view of the set of plural views of the scene that are being rendered, so as to provide a separate output value for a vertex for that vertex shading operation for each view of the set of views.

As will be appreciated by those skilled in the art, these embodiments of the technology described herein can and in an embodiment do include any one or more or all of the features of the technology described herein.

Thus, for example, the compiler (and compiling operation) is in an embodiment further configured to recognise (determine) when a set of plural images representing plural different views of the same scene is to be rendered (to determine whether the vertex shader program relates to performing multi-view rendering to render a set of plural images representing plural different views of the same scene), and to then process the vertex shader program accordingly.

Once the vertex shader program to be executed by the programmable vertex shading stage has been prepared (compiled), then that program may be provided to the vertex shading stage of the graphics processing pipeline for execution, as required. This is in an embodiment done in the conventional manner for providing shading programs to the graphics processing pipeline for the graphics processing system in question.

The vertex shading stage (the vertex shader) can then execute the vertex shading program for a vertex or vertices that are to be processed for rendering the set of plural images representing the plural different views of the scene.

The vertex shading program may be executed for a single vertex. However, it is in an embodiment executed for plural vertices (for a set of plural vertices that are to be processed for the purpose of rendering the set of plural images representing the plural different views of the scene).

Thus, in an embodiment, the vertex shader program is respectively executed for each vertex of a set of plural vertices that are to be processed. This set of vertices may, and in an embodiment does, comprise the entire set of vertices defined for the scene that is being rendered. It may also comprise a set of vertices that is defined for less than the entire scene, such as a set of vertices defined for a given draw call. In an embodiment, the set of vertices is a set of vertices defined for a draw call.

Where the set of vertices is less than the entire set of vertices defined for the scene being rendered, then in an embodiment the operation in the manner of the technology described herein is repeated appropriately for each set of vertices (e.g., and in an embodiment, each draw call) defined for the scene. Correspondingly, the process of the technology described herein is in an embodiment repeated for plural (multiview) render outputs to be generated, e.g. for successive scenes in a sequence of scenes to be rendered.

The execution of vertex shading program for each vertex that is to be processed (that the vertex shader is to be executed for) can be triggered and implemented as desired. This is in an embodiment done by issuing and executing an execution thread for each vertex that is to be processed.

Thus, the vertex shader program is in an embodiment executed for each vertex by issuing an execution thread for the vertex, which execution thread then executes the vertex shading program for the vertex in question. In an embodiment one execution thread is issued to and executed in the vertex shading stage for each vertex to be processed (per vertex to be processed). Thus, for example, where there are N views to be rendered for the scene and a set of M vertices defined for the scene, M execution threads will be issued and executed, one for each vertex in the set of vertices (as against, for example, NxM execution threads being issued and executed so as to process each vertex for each view separately).

The vertex shading stage can be triggered and controlled to execute the vertex shader program (only) once for a vertex for the set of plural views to be rendered in any suitable and desired manner. In an embodiment, a single vertex shading job (task) is defined (as against, e.g., defining plural vertex shading jobs (tasks), one for each view), that causes the vertex shader program to be executed (only) once for each vertex by issuing (only) a single thread for each vertex that executes the shader program (and thus produces all the vertex outputs for all the views).

In an embodiment the driver for the graphics processing pipeline (e.g. that is executing on the host processor of the overall graphics processing system) sets a single vertex shading job (task) for the graphics processing pipeline so as to control the vertex shading stage to execute the vertex shader program only once for each vertex for the set of plural views to be rendered.

Other arrangements would, of course, be possible.

The output from the vertex shading stage when the vertex shader program is executed will be a set of output data values (output vertex shaded vertex attribute values) for each vertex that has been processed (that the vertex shader program has been executed for). There will be, and is in an embodiment, (only) a single output value for the set of views for each vertex shading operation (vertex attribute) that is performed (processed) (only) once for the set of plural views, and one output value for each view for those vertex shading operations (vertex attributes) that are performed (processed) separately (once) for each view (per view). Thus for some vertex attributes there will be (only) a single output value for the set of views, but for other vertex attributes there will be N output values (where there are N views of the scene being rendered).

(It will be appreciated in this regard, that where a separate output value is being generated for a vertex attribute for each view, then while those separate output values may, and typically will, be different for each view, it could be that the same output value will be generated for more than one view for the vertex attribute in question (although the vertex shading operation will still be performed separately for each view).)

The output of the vertex shader program (the output vertex shaded attribute values) can be provided, e.g., and in an embodiment, for use by the graphics processing pipeline when rendering the images representing the different views of the scene, in any suitable and desired manner. The output of the vertex shader program (the output vertex shaded attribute values) is in an embodiment stored appropriately for (future) use. The output values may be stored in any appropriate storage, such as local memory, e.g. buffers, of the graphics processing pipeline, and/or main memory of the overall graphics processing system (of the data processing system that the graphics processing system is part of).

Thus, in an embodiment, the vertex shader program (the instructions in the vertex shader program) that is executed by the vertex shading stage of the graphics processing pipeline is configured to output the results of the vertex shading operations to memory, such as local buffers of the graphics processing pipeline and/or main memory of the overall graphics processing system (of the data processing system that the graphics processing system is part of) (in contrast, e.g. to simply outputting the results of the vertex shading operations to a FIFO or similar pipeline output arrangement).

Once the vertex shading operation has been performed (the vertex shader program executed) for the vertices that it is to be executed for, then the vertex shaded attributes data for the vertices can be, and is in an embodiment used by the remaining stages of the graphics processing pipeline to generate the desired multiview images of the scene being rendered.

Thus, in an embodiment, the output values generated by executing the vertex shader program are then used for and when rendering the plural images that each represent a respective view of the scene that is being rendered.

The rendering of each image may, and in an embodiment does, comprise using the vertex shaded vertex attributes to perform rasterisation and rendering to generate the final output images. The images can be rendered using the vertex shader output values in any suitable and desired manner (e.g. in accordance with the normal manner for rendering images for the graphics processing pipeline and system in question).

Thus, this processing can include any processing that a graphics processing pipeline can perform using vertex data, such as, inter alia, primitive (e.g. triangle) setup, rasterisation and rendering. These processes can be performed in any desired and suitable manner, e.g. depending upon the nature of the graphics processing pipeline in question.

Correspondingly, the subsequent graphics processing stages that are to use the outputs of the vertex shader can be any suitable and desired such graphics processing stages. They are in an embodiment subsequent shader stages of the graphics processing system. In an embodiment, the subsequent graphics processing stages include a fragment shader.

Thus, the technology described herein in an embodiment further comprises using the vertex shader output values to render one or more primitives so as to generate a set of output values representing an image that represents the scene for one of the views that the scene is to be rendered for (e.g. as seen from one of the viewpoints that the scene is to be rendered for). This is in an embodiment done for each (different) view that is required.

As part of this processing, the relevant graphics processing stage will, e.g. load the required vertex shader output values for the view that is being processed, e.g., and in an embodiment from the storage, e.g. memory, where they have been stored, and use those values for its processing appropriately. Thus, for those vertex shader output values that are generated for which only a single value is provided, e.g. stored, for the set of views, that single value will be used (and thus, e.g., loaded) for each view that is processed. Correspondingly, where view-specific vertex shader output values are generated and provided, e.g. stored, then the respective output value for the view in question will be used (e.g. loaded) when processing the view in question (the image relating to the view in question).

The output images are in an embodiment then exported to external, e.g. main, memory, for storage and use, such as to a frame buffer for a display. They may be temporarily stored locally to the graphics processor, e.g., in a tile buffer or buffers, before being exported to main memory, e.g., depending upon the nature and configuration of the graphics processing system.

Once all the images representing the desired different views of the scene have been generated and output, they may then, e.g. and in an embodiment, be displayed appropriately, e.g. to provide a stereoscopic display, e.g., and in an embodiment, on a display device that is associated with the graphics processing system (that is in communication with the graphics processing system).

The process may then be repeated for the next render output (e.g. the next frame to be displayed), and so on. The technology described herein is in an embodiment implemented for a sequence of frames to be displayed, and in an embodiment for each frame in a sequence of frames to be displayed, for example.

It should be noted here that although, as discussed above, in the technology described herein the vertex shader operation is performed (only) once per vertex for the set of views that are being rendered, other operations for rendering the views, such as the tiling (in the case of a tile-based graphics processing pipeline) and rendering (fragment shading) operations should be, and are in an embodiment, performed separately for each view (but using the appropriate vertex shaded output data from the single vertex shading task that has been performed).

Thus, in an embodiment, e.g. where N views are being rendered, N tiling jobs (tasks) (one for each view), and N fragment shading jobs (tasks) are in an embodiment defined and executed (again one for each view). Each tiling task will produce the tile lists for a respective one of the views. Each fragment shading task will produce the rendered output (image) for one of the views.

Again, the driver for the graphics processing pipeline in an embodiment configures the tasks (jobs) for the graphics processing pipeline in this manner.

Other arrangements would, of course, be possible.

Although the technology described herein has been described above with particular reference to the vertex shading operation of the graphics processing pipeline, the Applicants have recognised that the principles and operation in the manner of the technology described herein could be equally applicable to other parts of the graphics processing operation, and in particular to other programmable geometry processing stages of the overall geometry processing of the graphics processing pipeline, such as one or more of, and in an embodiment all of, a programmable tessellation stage, an evaluation (domain) shader, a hull shader, and a geometry shader (where present in the graphics processing pipeline).

Thus, the technology described herein also extends more generally to operation in the manner of the technology described herein for other programmable, e.g. shading, stages of a graphics processing pipeline.

Another embodiment of the technology described herein comprises a method of operating a graphics processing system, the graphics processing system including:

a graphics processing pipeline comprising a programmable processing stage that executes programs to perform graphics processing operations when generating an output of the graphics processing pipeline;
and
processing circuitry that is operable to convert a program provided for execution by the programmable processing stage of the graphics processing pipeline to a program to be executed by the programmable processing stage of the graphics processing pipeline;
the method comprising:
the processing circuitry:
determining for a program provided for execution by the programmable processing stage of the graphics processing pipeline, whether the program relates to performing multi-view rendering to render a set of plural images representing plural different views of the same scene;
and, when it is determined that the program relates to performing multi-view rendering to render a set of plural images representing plural different views of the same scene:
  determining whether the program includes a processing operation that can be performed only once for the set of plural views of the scene that are being rendered; and
  when it is determined that the program includes a processing operation that can be performed only once for the set of plural views of the scene that are being rendered, including in a program to be executed by the programmable processing stage of the graphics processing pipeline, a sequence of at least one graphics program instruction that when executed will cause the programmable processing stage of the graphics processing pipeline to perform that processing operation for a work item once for the set of plural views of the scene that are being rendered and to provide only a single output value for a work item for that processing operation for the set of views;
  and
  determining whether the program includes a processing operation that should be performed separately for each view of the set of plural views of the scene that are being rendered; and
  when it is determined that the program includes a processing operation that should be performed separately for each view of the set of plural views of the scene that are being rendered, including in the program to be executed by the programmable processing stage of the graphics processing pipeline, a sequence of at least one graphics program instruction that when executed will cause the programmable processing stage of the graphics processing pipeline to perform that processing operation for a work item separately for each view of the set of plural views of the scene that are being rendered, so as to provide a separate output value for a work item for that processing operation for each view of the set of views;
the method further comprising:
providing the program to the graphics processing pipeline for execution; and
the programmable processing stage of the graphics processing pipeline when it is to perform processing operations for work items to be processed for the set of plural views to be rendered, executing the program once for each work item to be processed;
wherein the executing the program for a work item comprises, in response to the instructions in the program:
  when the program provided to the graphics processing pipeline for execution comprises a sequence of at least one graphics program instruction that when executed will cause the programmable processing stage of the graphics processing pipeline to perform a processing operation for a work item once for the set of plural views of the scene that are being rendered and to provide only a single output value for a work item for that processing operation for the set of views, performing that processing operation for the work item once for the set of plural views of the scene that are being rendered and providing only a single output value for the work item for that processing operation for the set of views;
  and
  when the program provided to the graphics processing pipeline for execution comprises a sequence of at least one graphics program instruction that when executed will cause the programmable processing stage of the graphics processing pipeline to perform a processing operation for a work item separately for each view of the set of plural views of the scene that are being rendered, so as to provide a separate output value for a work item for that processing operation for each view of the set of views, performing that processing operation for the work item separately for each view of the set of plural views, so as to provide a separate output value for that processing operation for the work item for each view of the set of plural views that are being rendered.

Another embodiment of the technology described herein comprises a graphics processing system comprising:

a graphics processing pipeline comprising a programmable processing stage that executes programs to perform graphics processing operations when generating an output of the graphics processing pipeline;

the graphics processing system further comprising:

processing circuitry that is operable to convert a program provided for execution by the programmable processing stage of the graphics processing pipeline to a program to be executed by the programmable processing stage of the graphics processing pipeline;

wherein the processing circuitry is configured to:

determine for a program provided for execution by the programmable processing stage of the graphics processing pipeline, whether the program relates to performing multi-view rendering to render a set of plural images representing plural different views of the same scene;

and to, when it is determined that the program relates to performing multi-view rendering to render a set of plural images representing plural different views of the same scene:

determine whether the program includes a processing operation that can be performed only once for the set of plural views of the scene that are being rendered; and when it is determined that the program includes a processing operation that can be performed only once for the set of plural views of the scene that are being rendered, include in a program to be executed by the programmable processing stage of the graphics processing pipeline, a sequence of at least one graphics program instruction that when executed will cause the processing stage of the graphics processing pipeline to perform that processing operation for a work item once for the set of plural views of the scene that are being rendered and to provide only a single output value for a work item for that processing operation for the set of views;

and determine whether the program includes a processing operation that should be performed separately for each view of the set of plural views of the scene that are being rendered; and when it is determined that the program includes a processing operation that should be performed separately for each view of the set of plural views of the scene that are being rendered, include in a program to be executed by the programmable processing stage of the graphics processing pipeline, a sequence of at least one graphics program instruction that when executed will cause the programmable processing stage of the graphics processing pipeline to perform that processing operation for a work item separately for each view of the set of plural views of the scene that are being rendered, so as to provide a separate output value for a work item for that processing operation for each view of the set of views;

the graphics processing system further comprising processing circuitry configured to:

cause the programmable processing stage of the graphics processing pipeline to execute the program once for a set of plural views to be rendered for each work item to be processed for the set of plural views.

Another embodiment of the technology described herein comprises a method of compiling a program to generate instructions for a programmable processing stage of a graphics processing pipeline that executes programs to perform graphics processing operations;

the method comprising:

for a program to be executed by a programmable processing stage of a graphics processing pipeline when a set of plural images representing plural different views of the same scene is to be rendered:

determining whether the program includes a processing operation that can be performed only once for the set of plural views of the scene that are being rendered; and when it is determined that the program includes a processing operation that can be performed only once for the set of plural views of the scene that are being rendered, including in a program to be executed by a programmable processing stage of a graphics processing pipeline, a sequence of at least one graphics program instruction that when executed will cause the programmable processing stage of the graphics processing pipeline to perform that processing operation for a work item once for the set of plural views of the scene that are being rendered and to provide only a single output value for a work item for that processing operation for the set of views;

and determining whether the program includes a processing operation that should be performed separately for each view of the set of plural views of the scene that are being rendered; and when it is determined that the program includes a processing operation that should be performed separately for each view of the set of plural views of the scene that are being rendered, including in a program to be executed by a programmable processing stage of a graphics processing pipeline, a sequence of at least one graphics program instruction that when executed will cause the programmable processing stage of the graphics processing pipeline to perform that processing operation for a work item separately for each view of the set of plural views of the scene that are being rendered, so as to provide a separate output value for a work item for that processing operation for each view of the set of views.

Another embodiment of the technology described herein comprises a compiler that compiles programs to generate instructions for a programmable processing stage of a graphics processing pipeline that executes instructions to perform graphics processing operations;

wherein the compiler is configured to:

for a program to be executed by a programmable processing stage of a graphics processing pipeline when a set of plural images representing plural different views of the same scene is to be rendered:

determine whether the program includes a processing operation that can be performed only once for the set of plural views of the scene that are being rendered; and when it is determined that the program includes a processing operation that can be performed only once for the set of plural views of the scene that are being rendered, include in a program to be executed by a programmable processing stage of a graphics processing pipeline, a sequence of at least one graphics program instruction that when executed will cause the programmable processing stage of the graphics processing pipeline to perform that processing operation for a work item once for the set of plural views of the scene that are being rendered and to provide only a single output value for a work item for that processing operation for the set of views;

and determine whether the program includes a processing operation that should be performed separately for each view of the set of plural views of the scene that are being rendered; and when it is determined that the program includes a processing operation that should be performed separately for each view of the set of plural views of the scene that are being rendered, include in a program to be executed by a programmable processing stage of a graphics processing pipeline, a sequence of at least one graphics program instruction that when executed will cause the programmable processing stage of the graphics processing pipeline to perform that processing operation for a work item separately for each view of the set of plural views of the scene that are being rendered, so as to provide a separate output value for a work item for that processing operation for each view of the set of views.

As will be appreciated by those skilled in the art, these embodiments of the technology described herein can and in an embodiment do include any one or more of the features of the technology described herein, as appropriate.

Thus, the programmable processing stage of the graphics processing pipeline is in an embodiment a programmable geometry processing stage. Correspondingly, it is in an embodiment a programmable shading stage of the graphics processing pipeline and the program is correspondingly in an embodiment a shader program.

The programmable processing (shading) stage is in an embodiment a vertex shading stage, but could also be a hull shader, a tessellation stage (e.g. where tessellation is performed by executing a shader program), a domain (evaluation) shading stage (shader), or a geometry shading stage (shader).

Correspondingly, the work item should be, and is in an embodiment, an appropriate work item for the programmable processing (shading) stage and processing operation or operations in question. Thus, for example, the work item may be, and in embodiments is, one of: a vertex to be processed (e.g., and in an embodiment, in the case of a tessellation, evaluation or vertex shading stage); a patch (e.g., and in an embodiment, in the case of a hull shading stage); and a primitive (e.g. a point, line, triangle, etc.) (e.g., and in an embodiment, in the case of a geometry shading stage).

Where there are plural programmable processing, e.g. shading, stages, that could be operable in the manner of the technology described herein, then while only shader programs for a single one of those programmable processing (shading) stages could be handled in the manner of the technology described herein, in an embodiment shader programs for plural of those programmable processing (shading) stages, and in an embodiment for each of those programmable processing (shading) stages, are handled in the manner of the technology described herein (where it is appropriate to do that).

Although the technology described herein has been described above with reference to the preparation and use of shader programs that will perform one or more processing operations (only) once for a set of plural views of a scene that are being rendered and perform one or more other processing operations separately for each view of the set of plural views, the Applicants have recognised that there could be situations in which a shader program to be executed when generating a set of plural different views of the same scene could contain no view-independent instructions or, equally, no view-dependent instructions.

The Applicants have further recognised that the arrangements of the technology described herein may still be advantageous in those situations where a given shader program may have no view-independent instructions or no view-dependent instructions, for example because that may then still allow a single program which shades all of the views to be run, thereby still potentially reducing bandwidth, for example, since the input data may only need to be loaded (only) once.

Thus, another embodiment of the technology described herein comprises a method of operating a graphics processing system, the graphics processing system including:

a graphics processing pipeline comprising a programmable processing stage that executes programs to perform graphics processing operations when generating an output of the graphics processing pipeline;
and
processing circuitry that is operable to convert a program provided for execution by the programmable processing stage of the graphics processing pipeline to a program to be executed by the programmable processing stage of the graphics processing pipeline;
the method comprising:
the processing circuitry:
determining for a program provided for execution by the programmable processing stage of the graphics processing pipeline, whether the program relates to performing multi-view rendering to render a set of plural images representing plural different views of the same scene;
and, when it is determined that the program relates to performing multi-view rendering to render a set of plural images representing plural different views of the same scene:
determining whether the program includes a processing operation that can be performed only once for the set of plural views of the scene that are being rendered; and
when it is determined that the program includes a processing operation that can be performed only once for the set of plural views of the scene that are being rendered, including in a program to be executed by the programmable processing stage of the graphics processing pipeline, a sequence of at least one graphics program instruction that when executed will cause the programmable processing stage of the graphics processing pipeline to perform that processing operation for a work item once for the set of plural views of the scene that are being rendered and to provide only a single output value for a work item for that processing operation for the set of views; the method further comprising:
providing the program to the graphics processing pipeline for execution; and
the programmable processing stage of the graphics processing pipeline when it is to perform processing operations for work items to be processed for the set of plural views to be rendered, executing the program once for each work item to be processed;
wherein the executing the program for a work item comprises, in response to the instructions in the program:
when the program provided to the graphics processing pipeline for execution comprises a sequence of at least one graphics program instruction that when executed will cause the programmable processing stage of the graphics processing pipeline to perform a processing operation for a work item once for the set of plural views of the scene that are being rendered and to provide only a single output value for a work item for that processing operation for the set of views, performing that processing operation for the work item once for the set of plural views of the scene that are being rendered and providing only a single output value for the work item for that processing operation for the set of views.

Another embodiment of the technology described herein comprises a graphics processing system comprising:

a graphics processing pipeline comprising a programmable processing stage that executes programs to perform graphics processing operations when generating an output of the graphics processing pipeline;

the graphics processing system further comprising:

processing circuitry that is operable to convert a program provided for execution by the programmable processing stage of the graphics processing pipeline to a program to be executed by the programmable processing stage of the graphics processing pipeline;

wherein the processing circuitry is configured to:

determine for a program provided for execution by the programmable processing stage of the graphics processing pipeline, whether the program relates to performing multi-view rendering to render a set of plural images representing plural different views of the same scene;

and to, when it is determined that the program relates to performing multi-view rendering to render a set of plural images representing plural different views of the same scene:

determine whether the program includes a processing operation that can be performed only once for the set of plural views of the scene that are being rendered; and when it is determined that the program includes a processing operation that can be performed only once for the set of plural views of the scene that are being rendered, include in a program to be executed by the programmable processing stage of the graphics processing pipeline, a sequence of at least one graphics program instruction that when executed will cause the processing stage of the graphics processing pipeline to perform that processing operation for a work item once for the set of plural views of the scene that are being rendered and to provide only a single output value for a work item for that processing operation for the set of views;

the graphics processing system further comprising processing circuitry configured to:

cause the programmable processing stage of the graphics processing pipeline to execute the program once for a set of plural views to be rendered for each work item to be processed for the set of plural views.

Another embodiment of the technology described herein comprises a method of compiling a program to generate instructions for a programmable processing stage of a graphics processing pipeline that executes programs to perform graphics processing operations;

the method comprising:

for a program to be executed by a programmable processing stage of a graphics processing pipeline when a set of plural images representing plural different views of the same scene is to be rendered:

determining whether the program includes a processing operation that can be performed only once for the set of plural views of the scene that are being rendered; and when it is determined that the program includes a processing operation that can be performed only once for the set of plural views of the scene that are being rendered, including in a program to be executed by a programmable processing stage of a graphics processing pipeline, a sequence of at least one graphics program instruction that when executed will cause the programmable processing stage of the graphics processing pipeline to perform that processing operation for a work item once for the set of plural views of the scene that are being rendered and to provide only a single output value for a work item for that processing operation for the set of views.

Another embodiment of the technology described herein comprises a compiler that compiles programs to generate instructions for a programmable processing stage of a graphics processing pipeline that executes instructions to perform graphics processing operations;

wherein the compiler is configured to:

for a program to be executed by a programmable processing stage of a graphics processing pipeline when a set of plural images representing plural different views of the same scene is to be rendered:

determine whether the program includes a processing operation that can be performed only once for the set of plural views of the scene that are being rendered; and when it is determined that the program includes a processing operation that can be performed only once for the set of plural views of the scene that are being rendered, include in a program to be executed by a programmable processing stage of a graphics processing pipeline, a sequence of at least one graphics program instruction that when executed will cause the programmable processing stage of the graphics processing pipeline to perform that processing operation for a work item once for the set of plural views of the scene that are being rendered and to provide only a single output value for a work item for that processing operation for the set of views.

Another embodiment of the technology described herein comprises a method of operating a graphics processing system, the graphics processing system including:

a graphics processing pipeline comprising a programmable processing stage that executes programs to perform graphics processing operations when generating an output of the graphics processing pipeline;

and processing circuitry that is operable to convert a program provided for execution by the programmable processing stage of the graphics processing pipeline to a program to be executed by the programmable processing stage of the graphics processing pipeline;

the method comprising:

the processing circuitry:

determining for a program provided for execution by the programmable processing stage of the graphics processing pipeline, whether the program relates to performing multi-view rendering to render a set of plural images representing plural different views of the same scene;

and, when it is determined that the program relates to performing multi-view rendering to render a set of plural images representing plural different views of the same scene:

determining whether the program includes a processing operation that should be performed separately for each view of the set of plural views of the scene that are being rendered; and when it is determined that the program includes a processing operation that should be performed separately for each view of the set of plural views of the scene that are being rendered, including in the program to be executed by the programmable processing stage of the graphics processing pipeline, a sequence of at least one graphics program instruction that when executed will cause the programmable processing stage of the graphics processing pipeline to perform that processing operation for a work item separately for each view of the set of plural views of the scene that are being rendered, so as to provide a separate output value for a work item for that processing operation for each view of the set of views;

the method further comprising:

providing the program to the graphics processing pipeline for execution; and the programmable processing stage of the graphics processing pipeline when it is to perform processing operations for work items to be processed for the set of plural views to be rendered, executing the program once for each work item to be processed;

wherein the executing the program for a work item comprises, in response to the instructions in the program:

when the program provided to the graphics processing pipeline for execution comprises a sequence of at least one graphics program instruction that when executed will cause the programmable processing stage of the graphics processing pipeline to perform a processing operation for a work item separately for each view of the set of plural views of the scene that are being rendered, so as to provide a separate output value for a work item for that processing operation for each view of the set of views, performing that processing operation for the work item separately for each view of the set of plural views, so as to provide a separate output value for that processing operation for the work item for each view of the set of plural views that are being rendered.

Another embodiment of the technology described herein comprises a graphics processing system comprising:

a graphics processing pipeline comprising a programmable processing stage that executes programs to perform graphics processing operations when generating an output of the graphics processing pipeline;

the graphics processing system further comprising:

processing circuitry that is operable to convert a program provided for execution by the programmable processing stage of the graphics processing pipeline to a program to be executed by the programmable processing stage of the graphics processing pipeline;

wherein the processing circuitry is configured to:

determine for a program provided for execution by the programmable processing stage of the graphics processing pipeline, whether the program relates to performing multi-view rendering to render a set of plural images representing plural different views of the same scene;

and to, when it is determined that the program relates to performing multi-view rendering to render a set of plural images representing plural different views of the same scene:

determine whether the program includes a processing operation that should be performed separately for each view of the set of plural views of the scene that are being rendered; and when it is determined that the program includes a processing operation that should be performed separately for each view of the set of plural views of the scene that are being rendered, include in a program to be executed by the programmable processing stage of the graphics processing pipeline, a sequence of at least one graphics program instruction that when executed will cause the programmable processing stage of the graphics processing pipeline to perform that processing operation for a work item separately for each view of the set of plural views of the scene that are being rendered, so as to provide a separate output value for a work item for that processing operation for each view of the set of views; the graphics processing system further comprising processing circuitry configured to:

cause the programmable processing stage of the graphics processing pipeline to execute the program once for a set of plural views to be rendered for each work item to be processed for the set of plural views.

Another embodiment of the technology described herein comprises a method of compiling a program to generate instructions for a programmable processing stage of a graphics processing pipeline that executes programs to perform graphics processing operations;

the method comprising:

for a program to be executed by a programmable processing stage of a graphics processing pipeline when a set of plural images representing plural different views of the same scene is to be rendered:

determining whether the program includes a processing operation that should be performed separately for each view of the set of plural views of the scene that are being rendered; and when it is determined that the program includes a processing operation that should be performed separately for each view of the set of plural views of the scene that are being rendered, including in a program to be executed by a programmable processing stage of a graphics processing pipeline, a sequence of at least one graphics program instruction that when executed will cause the programmable processing stage of the graphics processing pipeline to perform that processing operation for a work item separately for each view of the set of plural views of the scene that are being rendered, so as to provide a separate output value for a work item for that processing operation for each view of the set of views.

Another embodiment of the technology described herein comprises a compiler that compiles programs to generate instructions for a programmable processing stage of a graphics processing pipeline that executes instructions to perform graphics processing operations;

wherein the compiler is configured to:

for a program to be executed by a programmable processing stage of a graphics processing pipeline when a set of plural images representing plural different views of the same scene is to be rendered:

determine whether the program includes a processing operation that should be performed separately for each view of the set of plural views of the scene that are being rendered; and when it is determined that the program includes a processing operation that should be performed separately for each view of the set of plural views of the scene that are being rendered, include in a program to be executed by a programmable processing stage of a graphics processing pipeline, a sequence of at least one graphics program instruction that when executed will cause the programmable processing stage of the graphics processing pipeline to perform that processing operation for a work item separately for each view of the set of plural views of the scene that are being rendered, so as to provide a separate output value for a work item for that processing operation for each view of the set of views.

As will be appreciated by those skilled in the art, all of these embodiments of the technology described herein may, and in an embodiment do, include any one or more or all of the features of the technology described herein, as appropriate.

The overall graphics processing system that the graphics processing pipeline is part of in an embodiment comprises a host processor that executes applications that can require graphics processing by the graphics processing pipeline.

The host processor will send appropriate commands and data to the graphics processing pipeline to control it to perform graphics processing operations and to produce graphics processing (render) output required by applications executing on the host processor.

To facilitate this, the host processor should, and in an embodiment does, also execute a driver for the graphics processing pipeline and a compiler or compilers for compiling shader programs to be executed by the programmable shading stages of the graphics processing pipeline (which compiler may be, and in an embodiment is, a part of the driver).

Thus in an embodiment, the graphics processing pipeline is in communication with a host microprocessor (that is part of the overall graphics processing system) that executes a driver for the graphics processing pipeline and a compiler or compilers for the graphics processing pipeline. The graphics processing pipeline and/or host microprocessor are in an embodiment also in communication with a display for displaying the images generated by the graphics processing pipeline (thus in an embodiment the graphics processing system further comprises a display for displaying the images generated by the graphics processing pipeline).

Although the compiler in an embodiment runs on a host processor of the overall data processing system that includes the graphics processing pipeline (with the graphics processing pipeline then being on another processor, such as a graphics processor, that is associated with the host processor (such that the compiler and compiled code run on separate processors within the overall data graphics processing system)), other arrangements would be possible. For example the compiler could run on the same processor as the compiled code, or the compiler could be run on a (completely) separate processor, such as the program being precompiled on a separate system and being distributed in a compiled form.

As will be appreciated by those skilled in the art, as well as the elements and stages described above, the graphics processing pipeline can otherwise include, and in an embodiment does include, any one or one or more, and in an embodiment all, of the other processing stages that graphics processing pipelines normally include. Thus, for example, the graphics processing pipeline in an embodiment also includes a primitive setup stage, a rasteriser and a renderer. In an embodiment the renderer is in the form of or includes a programmable fragment shader.

The graphics processing pipeline may also contain any other suitable and desired processing stages that a graphics processing pipeline may contain such as a depth (or depth and stencil) tester(s), a blender, a write out unit etc.

The programmable, shading stages of the graphics processing pipeline such as the vertex shader, fragment shader, etc., can be implemented as desired and in any suitable manner, and can perform any desired and suitable shading, e.g. vertex shading, fragment shading, etc., functions, respectively and as appropriate.

Each programmable processing stage (shader) may comprise any suitable programmable hardware element such as programmable processing circuitry. Each programmable processing stage (shader) may be provided as a separate circuit element to other programmable stages (shaders) of the processing pipeline or the programmable processing stages may share some or all of their programmable processing circuitry (that is then differently programmed to serve as the desired programmable processing stage (shader)).

In an embodiment, the graphics processing pipeline comprises, and/or is in communication with, one or more memories and/or memory devices that store the data described herein, and/or that store software for performing the processes described herein.

The technology described herein may be carried out by any kind of graphics processing system. However, in an embodiment, the graphics processing pipeline and system is a tile-based (tiling) graphics processing pipeline and system. In this case, the pipeline in an embodiment also comprises a tile buffer for storing tile sample values and/or a write out unit that operates to write the data in the tile buffer (e.g. once the data in the tile buffer is complete) out to external (main) memory (e.g. to a frame buffer).

In an embodiment, the various functions of the technology described herein are carried out on a single graphics processing platform that generates and outputs the rendered fragment data that is, e.g., written to a frame buffer for a display device.

The technology described herein can be implemented in any suitable system, such as a suitably configured microprocessor based system. In some embodiments, the technology described herein is implemented in computer and/or micro-processor based system.

The technology described herein is in an embodiment implemented in a portable device, such as, and in an embodiment, a mobile phone or tablet.

It is believed that the technology described herein would be particularly applicable to devices where multiview rendering will be required, such as for virtual reality display devices such as virtual reality headsets.

Thus, another embodiment of the technology described herein comprises a virtual reality display device comprising the graphics processing system of any one or more of the embodiments of the technology described herein. Correspondingly, another embodiment of the technology described herein comprises a method of operating a virtual reality display device, comprising operating the virtual reality display device in the manner of any one or more of the embodiments of the technology described herein.

The various functions of the technology described herein can be carried out in any desired and suitable manner. For example, the functions of the technology described herein can be implemented in hardware or software, as desired. Thus, for example, the various functional elements, stages and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display.

FIG. 1 shows a typical computer graphics processing system.

An application 2, such as a game, executing on a host processor 1 will require graphics processing operations to be performed by an associated graphics processing unit (graphics processing pipeline) 3. To do this, the application will generate API (Application Programming Interface) calls that are interpreted by a driver 4 for the graphics process pipeline 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

FIG. 2 shows the graphics processing pipeline 3 of the present embodiment in more detail.

The graphics processing pipeline 3 shown in FIG. 2 is a tile-based renderer and will thus produce tiles of a render output data array, such as an output frame to be generated.

(In tile-based rendering, rather than the entire render output, e.g., frame, effectively being processed in one go as in immediate mode rendering, the render output, e.g., frame to be displayed, is divided into a plurality of smaller sub-regions (areas), usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.)

The render output data array may, as is known in the art, typically be an output frame intended for display on a display device, such as a screen or printer, but may also, for example, comprise intermediate data intended for use in later rendering passes (also known as a "render to texture" output), etc.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

FIG. 2 shows the main elements and pipeline stages of the graphics processing pipeline 3 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuitry and/or processing logic, etc., for performing the necessary operation and functions.

As shown in FIG. 2, the graphics processing pipeline 3 includes a number of stages, including vertex shader 20, a hull shader 21, a tesselator 22, a domain shader 23, a geometry shader 24, a tiler 25, a rasterisation stage 26, an early Z (depth) and stencil test stage 27, a renderer in the form of a fragment shading stage 28, a late Z (depth) and stencil test stage 29, a blending stage 30, a tile buffer 31 and a downsampling and writeout (multisample resolve) stage 32.

The vertex shader 20 takes the input data values associated with the vertices, etc., defined for the output to be generated, and processes those data values to generate a set of corresponding "vertex shaded" output data values for use by subsequent stages of the graphics processing pipeline 3.

Each primitive to be processed is usually defined by and represented as a set of vertices. Each vertex for a primitive typically has associated with it a set of "attributes", i.e. a set of data values for the vertex. These attributes will typically include position data and other, non-position data (varyings), e.g. defining colour, light, normal, texture coordinates, etc, for the vertex in question.

For a given output to be generated by the graphics processing pipeline, there will typically be a set of vertices defined for the output in question. The primitives to be processed for the output will then be indicated as comprising given vertices in the set of vertices for the graphics processing output being generated.

The vertex shading operation operates to transform the attributes for each vertex into a desired form for the subsequent graphics processing operations. This may comprise, for example, transforming vertex position attributes from the world or user space that they are initially defined for to the screen space that the output of the graphics processing system is to be displayed in, modifying the input data to take account of the effect of lighting in the image to be rendered, etc.

The hull shader 21 performs operations on sets of patch control points and generates additional data known as patch constants. The tessellation stage 22 subdivides geometry to create higher-order representations of the hull, and the domain shader 23 performs operations on vertices output by the tessellation stage (similar to a vertex shader). The geometry shader 24 processes entire primitives such as a triangles, points or lines.

These stages together with the vertex shader 20 effectively perform all the necessary fragment frontend operations, such as transformation and lighting operations, and primitive setup, to setup the primitives to be rendered, in response to commands and vertex data provided to the graphics processing pipeline 3.

Once all the primitives to be rendered have been appropriately set up, the tiler 25 then determines which primitives need to be processed for each tile that the render output has been divided into for processing purposes. To do this, the tiler 25 compares the location of each primitive to be processed with the tile positions, and adds the primitive to a respective primitive list for each tile that it determines the primitive could (potentially) fall within. Any suitable and desired technique for sorting and binning primitives into tile lists, such as exact binning, or bounding box binning or anything in between, can be used for the tiling process.

Once the tiler has completed the preparation of the tile lists (lists of primitives to be processed for each tile), then each tile can be rendered.

To do this, each tile is processed by the graphics processing pipeline stages shown in FIG. 2 that follow the tiler 25.

Thus, when a given tile is being processed, each primitive that is to be processed for that tile (that is listed in a tile list for that tile) is passed to the rasteriser 26.

The rasterisation stage 26 of the graphics processing pipeline 3 operates to rasterise the primitives into individual graphics fragments for processing. To do this, the rasteriser 26 rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 27 performs a Z (depth) test on fragments it receives from the rasteriser 26, to see if any fragments can be discarded (culled) at this stage. To do this, it compares the depth values of (associated with) fragments issuing from the rasteriser 26 with the depth values of fragments that have already been rendered (these depth values are stored in a depth (Z) buffer that is part of the tile buffer 31) to determine whether the new fragments will be occluded by fragments that have already been rendered (or not). At the same time, an early stencil test is carried out.

Fragments that pass the fragment early Z and stencil test stage 27 are then sent to the fragment shading stage 28. The fragment shading stage 28 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 28 is in the form of a shader pipeline (a programmable fragment shader).

There is then a "late" fragment Z and stencil test stage 29, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 31 to determine whether the fragment data for the new fragments should replace the fragment data of the fragments that have already been rendered, by comparing the depth values of (associated with) fragments issuing from the fragment shading stage 28 with the depth values of fragments that have already been rendered (as stored in the depth buffer). This late fragment depth and stencil test stage 29 also carries out any necessary "late" alpha and/or stencil tests on the fragments.

The fragments that pass the late fragment test stage 29 are then subjected to, if required, any necessary blending operations with fragments already stored in the tile buffer 31 in the blender 30. Any other remaining operations necessary on the fragments, such as dither, etc. (not shown) are also carried out at this stage.

Finally, the (blended) output fragment data (values) are written to the tile buffer 31 from where they can, for example, be output to a frame buffer 33 for display. The depth value for an output fragment is also written appropriately to a Z-buffer within the tile buffer 31. (The tile buffer stores colour and depth buffers that store an appropriate colour, etc., or Z-value, respectively, for each sampling point that the buffers represent (in essence for each sampling point of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 31 is input to a downsampling (multisample resolve) write out unit 32, and thence output (written back) to an external memory output buffer, such as a frame buffer 33 of a display device (not shown). (The display device could comprise, e.g., a display comprising an array of pixels, such as a computer monitor or a printer.)

The downsampling and writeout unit 32 downsamples the fragment data stored in the tile buffer 31 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer 33 in a main memory) for storage, the next tile is then processed, and so on, until sufficient tiles have been processed to generate the entire render output (e.g. frame (image) to be displayed). The process is then repeated for the next render output (e.g. frame) and so on.

As can be seen from FIG. 2, the graphics processing pipeline 3 includes a number of programmable processing or "shader" stages, namely the vertex shader 20, hull shader 21, domain shader 23, geometry shader 24, and the fragment shader 28. These programmable shader stages execute respective shader programs that have one or more input variables and generate sets of output variables. Typically the shader program in question will be executed for each work item (e.g. vertex in the case of a vertex shader) to be processed. Typically an execution thread will be issued for each work item to be processed, and the thread will then execute the instructions in the shader program to produce the desired "shaded" output data.

The application 2 provides the shader programs to be executed using a high-level shader programming language, such as GLSL, HLSL, OpenCL, etc. These shader programs are then translated by a shader language compiler to binary code for the target graphics processing pipeline 3. This may include the creation of one or more internal (intermediate) representations of the program within the compiler. (The compiler may, e.g., be part of the driver 4, with there being a special API call to cause the compiler to run. The compiler execution can thus be seen as being part of the, e.g. draw call preparation done by the driver in response to API calls generated by an application).

Other arrangements for the graphics processing pipeline 3 would, of course, be possible.

The technology described herein relates to the situation in which the graphics processing pipeline 3 of FIG. 2 is being used to render a set of images that represent plural views of the same scene, such as a pair of images to be used for a stereoscopic display.

FIG. 3 illustrates the general principles behind stereoscopic images.

FIG. 3a shows a single viewpoint and corresponding view cone 11, a computer generated scene 12, and an image 13 representing a single view of the scene 12, e.g., for display.

FIG. 3b shows a pair of images representing the same scene 12 as FIG. 3a but from slightly different viewpoints so as to give a stereoscopic effect.

The first image 18 represents the scene 12 from the viewpoint of the left eye. The second image 19 of the pair represents the scene 12 from the viewpoint of the right eye. The images may accordingly be referred to as the left view image and right view image respectively.

As can be seen in the Figure, the viewpoints are positioned slightly apart from one another so as to provide a binocular effect. Each viewpoint has its respective viewing cone and image plane. In particular, the left view has a view cone 16 and image plane 112, whilst the right view has viewing cone 17 and image plane 113. The cone axis of the first image and the second image (axis 110 and 111, respectively) are parallel to one another and extend in the same direction.

FIG. 3c shows a similar arrangement to that of FIG. 3b, except that in this example the axis 110 of the left image view cone 16 and the axis 111 of the right image view cone 17 are not parallel to one another but converge.

When rendering a pair of images for a stereoscopic display, typically each image will be rendered separately, and then the images displayed appropriately to provide a stereoscopic effect. In the present embodiments, this operation is modified at least in respect of the vertex shading operation, so as to provide a more efficient process for rendering the set of images that represent the plural views of the scene.

In particular, in the present embodiment, rather than executing the vertex shader program separately for each view that is being rendered, a single vertex shading program is executed once for all the views, but with that vertex shader program configured so as to, for view-dependent operations, perform the respective operation separately for each view, so as to derive an appropriate vertex shaded output attribute value for each view, but for other vertex shading operations that are not dependent upon the view being rendered (i.e. that are view-independent) perform those vertex shading operations only once for the set of views and to provide only a single vertex shaded output value for each vertex attribute in question for the set of views.

To do this, the compiler for the vertex shader (i.e. that provides the vertex shader program for execution by the vertex shader 20 of the graphics processing pipeline 3) modifies the vertex shader program that it receives from the application that requires the graphics processing such that the vertex shader 20 will operate in the above manner (when it executes the vertex shader program).

Figure 4:
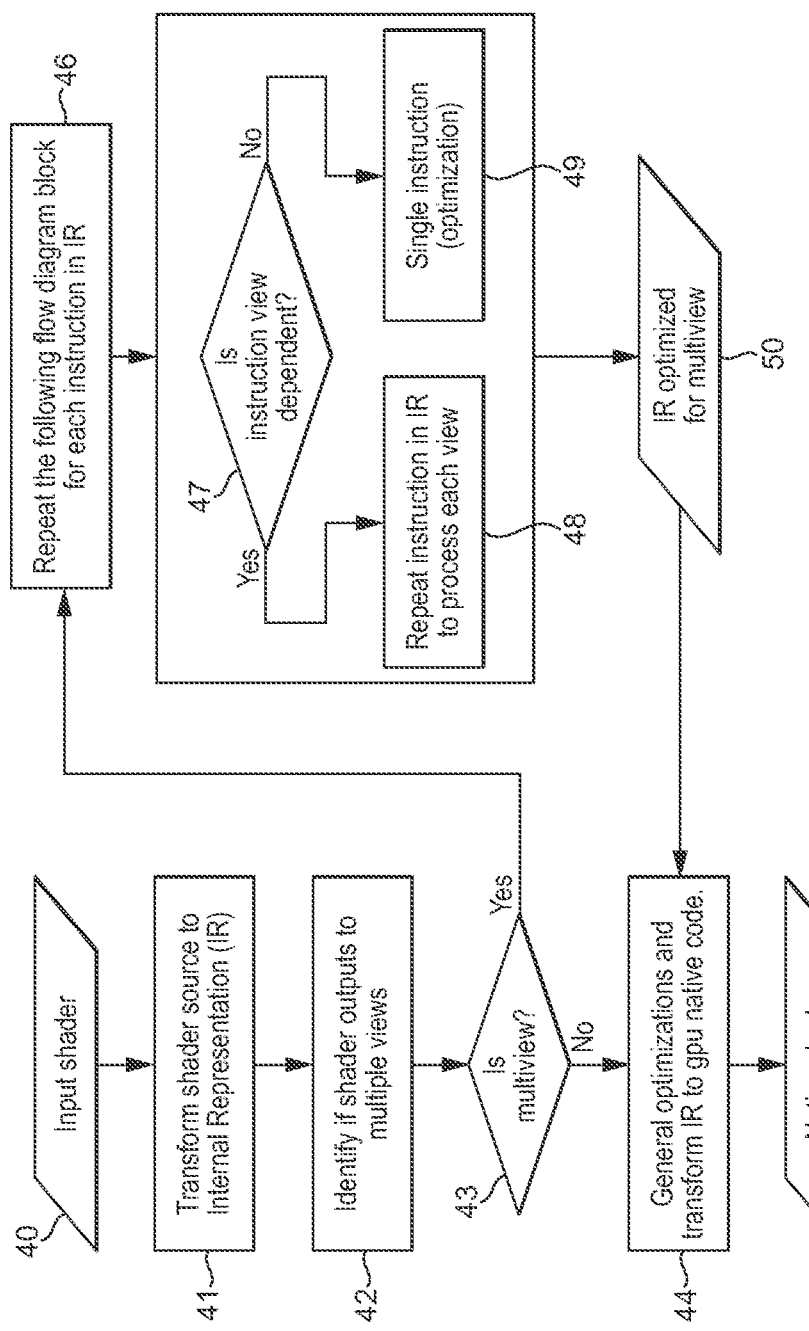
FIG. 4 shows schematically the compiler operation in an embodiment of the technology described herein.

This operation is shown schematically in FIG. 4.

As shown in FIG. 4, the vertex shader compiler (which may, e.g., be executed as part of the driver 4 for the graphics processing pipeline 3 on the host processor 1) will receive an input vertex shader program from the application that requires the graphics processing to be compiled (step 40).

As discussed above, a shader program to be executed by a given "shader" stage of a graphics processing pipeline will be provided by the application that requires the graphics processing using a high-level shader programming language, such as GLSL, HLSL, OpenCL, etc. The high-level shader program is then translated by the shader language compiler to binary code for the target graphics processing pipeline. This binary code will consist of "instructions" which are specified in the instruction set specification for the given target graphics processing pipeline.

The compilation process for converting the high-level shader language to binary code instructions may take place via one or more internal (intermediate) representations of the program within the compiler (and there may be several successive intermediate (internal) representations within the compiler), if desired.

As shown in FIG. 4, it is assumed that the compilation process in the present embodiment uses an internal representation of the shader program. Other arrangements would, of course, be possible.

Thus, as shown in FIG. 4, the compiler first transforms the shader source code it receives to an appropriate internal representation of the shader program for the compilation process (step 41).

The compiler then determines if the rendering operation that is being performed is a multi-view rendering operation (i.e. is to render plural different views of the same scene (e.g. from plural different viewpoints)) (steps 42 and 43). This may be determined, e.g., from metadata and/or state information that is associated with the input shader program. In the case of the OpenGL and OpenGL ES APIs, the compiler determines if the rendering operation that is being performed is a multi-view rendering operation by identifying use of the OVR_multi-view extension in the input shader program.

If multi-view rendering is not being performed, then the compiler can simply proceed to perform its normal compiler optimisations and transform the internal representation of the vertex shader program to the appropriate native binary code for the graphics processing pipeline 3 (step 44). The appropriate binary code for execution by the vertex shader of the graphics processing pipeline 3 can then be provided appropriately to the graphics processing pipeline (step 45), e.g. in the conventional manner for the graphics processing system and the host processor in question.

On the other hand, if it is determined that the vertex shader relates to multi-view processing, then, as shown in FIG. 4 the vertex shader compiler performs further compilation operations and optimisations on the vertex shader program.

To do this, the vertex shader compiler considers each instruction in the (internal representation of) the vertex shader program (step 46) and determines whether the instruction is view-dependent or not (step 47) (i.e. determines whether the instruction relates to a view-dependent vertex shading operation and/or vertex attribute or not). This determination may be performed as desired, e.g., based on state information and/or metadata that is associated with the instruction in question. In the case of the use of the OVR_multi-view extension for OpenGL/OpenGL ES, a shader program instruction is identified as being view-dependent if it has a view ID associated with it. Corresponding arrangements can be used via the graphics APIs.

If at step 47 it is determined that the instruction is view-dependent, then the compiler operates to include the instruction multiple times in the compiled shader program, once for each view that is being generated (step 48). In other words, the compiler operates to repeat the instruction in the compiled shader program once for each view (with the instruction being configured to load the appropriate input values for the view in question and to output its output value appropriately for the view in question).

On the other hand, if at step 47 it is determined that the shader program instruction is not view-dependent, then the compiler includes the instruction once in the compiled shader program (step 49), so that that instruction (vertex shading operation) will be executed only once in the shader program by the vertex shader 20 of the graphics processing pipeline 3 when it executes the vertex shader program and will provide only a single output value for that instruction.

In this way, the vertex shader program is optimised for multi-view processing, by having instructions and operations that are view-independent only included once in the compiled vertex shader program, but those instructions and operations that are view-dependent are repeated in the compiled shader program once for each view that is required. This then provides a compiled shader program that is optimised for multi-view rendering (step 50).

The so-optimised shader program may then be further subject to the more general shader compiler optimisations, and subsequently transformed to the native binary code for the graphics processing pipeline 3 (step 44), with the native shader program code then being provided appropriately to the graphics processing pipeline 3 for execution (step 45).

In the present embodiment, exemplary view dependent operations and vertex attributes include transformed vertex positions, view vectors and reflection vectors. Exemplary view independent operations and vertex attributes include matrix skinning, vertex texturing and texture coordinates. Other arrangements would, of course, be possible.

As well as the compiler compiling the vertex shader program as described above when multi-view rendering is being performed, the driver 4 for the graphics processing pipeline 3 also configures the processing "jobs" (tasks) that the graphics processing pipeline 3 is to execute when performing the multi-view rendering appropriately. An embodiment of this is shown in FIG. 5.

Figure 5:
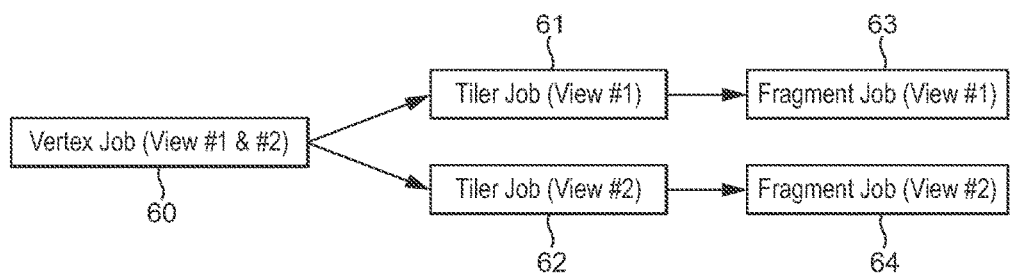
FIG. 5 shows schematically the task chain for the graphics processing pipeline in an embodiment of the technology described herein.

In FIG. 5, it is assumed that stereoscopic rendering is being performed, such that two views of the scene are to be rendered.

As shown in FIG. 5, to render the two views, the driver 4 prepares a single vertex job 60 that will cause the vertex shader 20 of the graphics processing pipeline 3 to execute the compiled vertex shading program once only (for both views), but then prepares separate tiler jobs 61, 62 and fragment jobs 63, 64 for each view. This is because the tiling process still needs to be performed for each view separately, as do the subsequent rasterising and rendering processes.

When performing the multi-view rendering operation in accordance with the arrangements shown in FIGS. 4 and 5, the graphics processing pipeline 3 will accordingly execute a single vertex job in the vertex shader 20, by executing the appropriately compiled vertex shader program.

The tiler 25 will then use the results of that vertex shader program (and any of the other geometry processing operations) to prepare appropriate tile lists for each view that is to be rendered separately. Once the tile lists for a respective view have been performed, then the tiles for that view can be rendered to provide the appropriate image for that view. These operations will all use the appropriate vertex shaded attribute output values, but may otherwise operate in any suitable and desired manner (e.g. in the normal manner for the graphics processing pipeline in question).

Once the images representing the scene from the different viewpoints have been rendered, they can then be displayed appropriately. The process can then be repeated for the next scene to be displayed, and so on.

A number of modifications, variations and optional features to the above embodiments would be possible, if desired.

For example, although the above embodiments have been described with particular reference to the vertex shading operation, it would correspondingly be possible to arrange one or more of the hull shader, the tessellator, the domain shader and the geometry shader, for example, to operate in a similar manner (i.e. to perform some shading operations once for the set of plural views, and to perform other shading operations separately for each view).

Correspondingly, although FIG. 4 shows the identification of the view-dependent and view-independent instructions using an intermediate representation of the original shader program, that identification (and the compilation optimisation in general) can be performed at any desired and suitable level of the shader program expression and compilation process, for example in the high level shader language, or as instructions in the target binary code for the graphics processing pipeline.

Similarly, although in the above embodiment the compiler is assumed to receive and operate on the high-level language representation of the shader program, it would also be possible for the compiler to receive and perform its operation on an intermediate representation of the shader code that is fed to the compiler.

Although in the above embodiments the different views of the scene that are being rendered represent the scene from different viewpoints, it would also or instead be possible for the different views to represent the scene from the same viewpoint, but to differ in some other way, for example by having a different field of view or scaling factor to the scene.

Correspondingly, although in the above described embodiments the shader program includes both view-dependent and view-independent instructions, the present embodiments could also correspondingly be applied to shader programs that contain only view-independent instructions or that contain only view-dependent instructions.

As can be seen from the above, the technology described herein, in its embodiments at least, provides arrangements for performing, e.g. vertex shading, when performing multi-view rendering in a more efficient manner.

This is achieved, in the embodiments of the technology described herein at least, by configuring an, e.g. vertex shader program, to be executed by a graphics processing pipeline such that those shading operations that are view-independent are only performed once for the set of plural views that is being generated, whilst shading operations that are view-dependent are still performed separately for each view.

What is claimed is:

1. A method of operating a graphics processing system, the graphics processing system including:
    a graphics processing pipeline comprising a programmable processing stage that executes programs to perform graphics processing operations when generating an output of the graphics processing pipeline; and
    processing circuitry that is operable to convert a program provided for execution by the programmable processing stage of the graphics processing pipeline to a program to be executed by the programmable processing stage of the graphics processing pipeline;
    the method comprising:
    the processing circuitry:
    determining for a program provided for execution by the programmable processing stage of the graphics processing pipeline, whether the program relates to performing multi-view rendering to render a set of plural images representing plural different views of the same scene;
    and, when it is determined that the program relates to performing multi-view rendering to render a set of plural images representing plural different views of the same scene, at least one of:
    (i) determining whether the program includes a processing operation that can be performed only once for the set of plural views of the scene that are being rendered; and when it is determined that the program includes a processing operation that can be performed only once for the set of plural views of the scene that are being rendered, including in a program to be executed by the programmable processing stage of the graphics processing pipeline, a sequence of at least one graphics program instruction that when executed will cause the programmable processing stage of the graphics processing pipeline to perform that processing operation for a work item once for the set of plural views of the scene that are being rendered and to provide only a single output value for a work item for that processing operation for the set of views; and
    (ii) determining whether the program includes a processing operation that should be performed separately for each view of the set of plural views of the scene that are being rendered; and when it is determined that the program includes a processing operation that should be performed separately for each view of the set of plural views of the scene that are being rendered, including in the program to be executed by the programmable processing stage of the graphics processing pipeline, a sequence of at least one graphics program instruction that when executed will cause the programmable processing stage of the graphics processing pipeline to perform that processing operation for a work item separately for each view of the set of plural views of the scene that are being rendered, so as to provide a separate output value for a work item for that processing operation for each view of the set of views;
    the method further comprising:
    providing the program to the graphics processing pipeline for execution; and
    the programmable processing stage of the graphics processing pipeline when it is to perform processing operations for work items to be processed for the set of plural views to be rendered, executing the program once for each work item to be processed;
    wherein the executing the program for a work item comprises, in response to the instructions in the program, at least one of:
    (i) when the program provided to the graphics processing pipeline for execution comprises a sequence of at least one graphics program instruction that when executed will cause the programmable processing stage of the graphics processing pipeline to perform a processing operation for a work item once for the set of plural views of the scene that are being rendered and to provide only a single output value for a work item for that processing operation for the set of views, performing that processing operation for the work item once for the set of plural views of the scene that are being rendered and providing only a single output value for the work item for that processing operation for the set of views; and
    (ii) when the program provided to the graphics processing pipeline for execution comprises a sequence of at least one graphics program instruction that when executed will cause the programmable processing stage of the graphics processing pipeline to perform a processing operation for a work item separately for each view of the set of plural views of the scene that are being rendered, so as to provide a separate output value for a work item for that processing operation for each view of the set of views, performing that processing operation for the work item separately for each view of the set of plural views, so as to provide a separate output value for that processing operation for the work item for each view of the set of plural views that are being rendered.

2. The method of claim 1, wherein:

the program is configured to cause the programmable processing stage when it executes the program, to perform a processing operation for a work item only once for the set of plural views of the scene that are being rendered, and to provide only a single output value for the processing operation for the set of views, by including a single set of instructions for performing the processing operation in the program that is provided to and executed by the programmable processing stage.

3. The method of claim 1, wherein:

the program is configured to cause the programmable processing stage, when it executes the program, to perform a processing operation for a work item separately for each view of the set of plural views of the scene that are being rendered, and to provide a separate output value for the processing operation for each view of the set of views, by including the set of instructions for performing the processing operation multiple times in the program that is provided to and executed by the programmable processing stage, once for each view that is being rendered.

4. The method of claim 1, comprising:

identifying processing operations that can be performed only once for the set of plural views of the scene that are being rendered, and processing operations that should be performed separately for each view, from information associated with the program code.

5. The method of claim 1, comprising including in the program to be executed by the programmable processing stage of the graphics processing pipeline at least one of:

(i) a sequence of graphics program instructions that when executed will cause the programmable processing stage to perform one or more processing operations for a work item once for the set of plural views of the scene that are being rendered and to provide only a single output value for that processing operation or operations for the set of views, but not including in the program any graphics program instructions that when executed will cause the programmable processing stage to perform any processing operations for a work item separately for each view of the set of plural views; and (ii) a sequence of graphics program instructions that when executed will cause the programmable processing stage to perform one or more processing operations for a work item separately for each view of the set of plural views, so as to provide a separate output value for that processing operation or operations for each view of the set of plural views that are being rendered, but not including in the program any graphics program instructions that when executed will cause the programmable processing stage to perform one or more processing operations for a work item once for the set of plural views of the scene that are being rendered and to provide only a single output value for that processing operation or operations for the set of views.

6. The method of claim 1, wherein the program provided for execution by the programmable processing stage of the graphics processing pipeline comprises one of:

a program provided in a high-level programming language by an application that requires graphics processing; and an intermediate representation of a program provided in a high-level programming language by an application that requires graphics processing.

7. The method of claim 1, further comprising:

defining a single processing task for the graphics processing pipeline to cause the program to be executed once for each work item to be processed for the set of plural views that is being rendered.

8. The method of claim 1, further comprising:

using the output values generated by executing the program when rendering the plural images that each represent a respective view of the scene that is being rendered.

9. The method of claim 1, wherein:

the processing circuitry comprises a compiler for the programmable processing stage.

10. The method of claim 1, wherein:

the programmable processing stage of the graphics processing pipeline is one of: a vertex shading stage, a hull shader, a tessellation stage, a domain shading stage, or a geometry shading stage.

11. The method of claim 1, wherein:

the programmable processing stage of the graphics processing pipeline is a vertex shading stage; and the vertex shading operations that are performed only once for the set of plural views comprise one or more of: matrix skinning, vertex texturing, position shading, and texture coordinate processing; and the vertex shading operations that are performed separately for each view comprise one or more of: transforming vertex positions, deriving a view vector, and deriving a reflection vector.

12. A graphics processing system comprising:

a graphics processing pipeline comprising a programmable processing stage that executes programs to perform graphics processing operations when generating an output of the graphics processing pipeline;

the graphics processing system further comprising:

processing circuitry that is operable to convert a program provided for execution by the programmable processing stage of the graphics processing pipeline to a program to be executed by the programmable processing stage of the graphics processing pipeline;

wherein the processing circuitry is configured to:

determine for a program provided for execution by the programmable processing stage of the graphics processing pipeline, whether the program relates to performing multi-view rendering to render a set of plural images representing plural different views of the same scene;

and to, when it is determined that the program relates to performing multi-view rendering to render a set of plural images representing plural different views of the same scene, at least one of:

(i) determine whether the program includes a processing operation that can be performed only once for the set of plural views of the scene that are being rendered; and when it is determined that the program includes a processing operation that can be performed only once for the set of plural views of the scene that are being rendered, include in a program to be executed by the programmable processing stage of the graphics processing pipeline, a sequence of at least one graphics program instruction that when executed will cause the processing stage of the graphics processing pipeline to perform that processing operation for a work item once for the set of plural views of the scene that are being rendered and to provide only a single output value for a work item for that processing operation for the set of views; and (ii) determine whether the program includes a processing operation that should be performed separately for each view of the set of plural views of the scene that are being rendered; and when it is determined that the program includes a processing operation that should be performed separately for each view of the set of plural views of the scene that are being rendered, include in a program to be executed by the programmable processing stage of the graphics processing pipeline, a sequence of at least one graphics program instruction that when executed will cause the programmable processing stage of the graphics processing pipeline to perform that processing operation for a work item separately for each view of the set of plural views of the scene that are being rendered, so as to provide a separate output value for a work item for that processing operation for each view of the set of views;

the graphics processing system further comprising processing circuitry configured to:

cause the programmable processing stage of the graphics processing pipeline to execute the program once for a set of plural views to be rendered for each work item to be processed for the set of plural views.

13. The system of claim 12, wherein:
the program is configured to cause the programmable processing stage when it executes the program, to perform a processing operation for a work item only once for the set of plural views of the scene that are being rendered, and to provide only a single output value for the processing operation for the set of views, by including a single set of instructions for performing the processing operation in the program that is provided to and executed by the programmable processing stage.

14. The system of claim 12, wherein:
the program is configured to cause the programmable processing stage, when it executes the program, to perform a processing operation for a work item separately for each view of the set of plural views of the scene that are being rendered, and to provide a separate output value for the processing operation for each view of the set of views, by including the set of instructions for performing the processing operation multiple times in the program that is provided to and executed by the programmable processing stage, once for each view that is being rendered.

15. The system of claim 12, wherein the processing circuitry is configured to:
identify processing operations that can be performed only once for the set of plural views of the scene that are being rendered, and processing operations that should be performed separately for each view, from information associated with the program code.

16. The system of claim 12, wherein the processing circuitry includes in the program to be executed by the programmable processing stage of the graphics processing pipeline at least one of:

(i) a sequence of graphics program instructions that when executed will cause the programmable processing stage to perform one or more processing operations for a work item once for the set of plural views of the scene that are being rendered and to provide only a single output value for that processing operation or operations for the set of views, but does not include in the program any graphics program instructions that when executed will cause the programmable processing stage to perform any processing operations for a work item separately for each view of the set of plural views; and (ii) a sequence of graphics program instructions that when executed will cause the programmable processing stage to perform one or more processing operations for a work item separately for each view of the set of plural views, so as to provide a separate output value for that processing operation or operations for each view of the set of plural views that are being rendered, but does not include in the program any graphics program instructions that when executed will cause the programmable processing stage to perform one or more processing operations for a work item once for the set of plural views of the scene that are being rendered and to provide only a single output value for that processing operation or operations for the set of views.

17. The system of claim 12, wherein the program provided for execution by the programmable processing stage of the graphics processing pipeline comprises one of:
a program provided in a high-level programming language by an application that requires graphics processing; and
an intermediate representation of a program provided in a high-level programming language by an application that requires graphics processing.

18. The system of claim 12, wherein the processing circuitry is configured to:
define a single processing task for the graphics processing pipeline to cause the program to be executed once for each work item to be processed for the set of plural views that is being rendered.

19. The system of claim 12, further comprising processing circuitry configured to:
use the output values generated by executing the program when rendering the plural images that each represent a respective view of the scene that is being rendered.

20. The system of claim 12, wherein:
the processing circuitry comprises a compiler for the programmable processing stage.

21. The system of claim 12, wherein:
the programmable processing stage of the graphics processing pipeline is one of: a vertex shading stage, a hull shader, a tessellation stage, a domain shading stage, or a geometry shading stage.

22. The system of claim 12, wherein:
the programmable processing stage of the graphics processing pipeline is a vertex shading stage; and
the vertex shading operations that are performed only once for the set of plural views comprise one or more of: matrix skinning, vertex texturing, position shading, and texture coordinate processing; and
the vertex shading operations that are performed separately for each view comprise one or more of: transforming vertex positions, deriving a view vector, and deriving a reflection vector.

23. A virtual reality display device comprising a graphics processing system comprising:

a graphics processing pipeline comprising a programmable processing stage that executes programs to perform graphics processing operations when generating an output of the graphics processing pipeline;
the graphics processing system further comprising:
processing circuitry that is operable to convert a program provided for execution by the programmable processing stage of the graphics processing pipeline to a program to be executed by the programmable processing stage of the graphics processing pipeline;
wherein the processing circuitry is configured to:
determine for a program provided for execution by the programmable processing stage of the graphics processing pipeline, whether the program relates to performing multi-view rendering to render a set of plural images representing plural different views of the same scene;
and to, when it is determined that the program relates to performing multi-view rendering to render a set of plural images representing plural different views of the same scene, at least one of:
  (i) determine whether the program includes a processing operation that can be performed only once for the set of plural views of the scene that are being rendered; and when it is determined that the program includes a processing operation that can be performed only once for the set of plural views of the scene that are being rendered, include in a program to be executed by the programmable processing stage of the graphics processing pipeline, a sequence of at least one graphics program instruction that when executed will cause the processing stage of the graphics processing pipeline to perform that processing operation for a work item once for the set of plural views of the scene that are being rendered and to provide only a single output value for a work item for that processing operation for the set of views; and
  (ii) determine whether the program includes a processing operation that should be performed separately for each view of the set of plural views of the scene that are being rendered; and when it is determined that the program includes a processing operation that should be performed separately for each view of the set of plural views of the scene that are being rendered, include in a program to be executed by the programmable processing stage of the graphics processing pipeline, a sequence of at least one graphics program instruction that when executed will cause the programmable processing stage of the graphics processing pipeline to perform that processing operation for a work item separately for each view of the set of plural views of the scene that are being rendered, so as to provide a separate output value for a work item for that processing operation for each view of the set of views;
the graphics processing system further comprising processing circuitry configured to:
cause the programmable processing stage of the graphics processing pipeline to execute the program once for a set of plural views to be rendered for each work item to be processed for the set of plural views.

24. A non-transitory computer readable storage medium storing computer software code which when executing on a processor performs a method of compiling a program to generate instructions for a programmable processing stage of a graphics processing pipeline that executes programs to perform graphics processing operations;
the method comprising:
for a program to be executed by a programmable processing stage of a graphics processing pipeline when a set of plural images representing plural different views of the same scene is to be rendered, at least one of:
  (i) determining whether the program includes a processing operation that can be performed only once for the set of plural views of the scene that are being rendered; and when it is determined that the program includes a processing operation that can be performed only once for the set of plural views of the scene that are being rendered, including in a program to be executed by a programmable processing stage of a graphics processing pipeline, a sequence of at least one graphics program instruction that when executed will cause the programmable processing stage of the graphics processing pipeline to perform that processing operation for a work item once for the set of plural views of the scene that are being rendered and to provide only a single output value for a work item for that processing operation for the set of views; and
  (ii) determining whether the program includes a processing operation that should be performed separately for each view of the set of plural views of the scene that are being rendered; and when it is determined that the program includes a processing operation that should be performed separately for each view of the set of plural views of the scene that are being rendered, including in a program to be executed by a programmable processing stage of a graphics processing pipeline, a sequence of at least one graphics program instruction that when executed will cause the programmable processing stage of the graphics processing pipeline to perform that processing operation for a work item separately for each view of the set of plural views of the scene that are being rendered, so as to provide a separate output value for a work item for that processing operation for each view of the set of views.

25. A non-transitory computer readable storage medium storing computer software code which when executing on a processor performs a method of operating a graphics processing system, the graphics processing system including:
a graphics processing pipeline comprising a programmable processing stage that executes programs to perform graphics processing operations when generating an output of the graphics processing pipeline;
and
processing circuitry that is operable to convert a program provided for execution by the programmable processing stage of the graphics processing pipeline to a program to be executed by the programmable processing stage of the graphics processing pipeline;
the method comprising:
the processing circuitry:
determining for a program provided for execution by the programmable processing stage of the graphics processing pipeline, whether the program relates to performing multi-view rendering to render a set of plural images representing plural different views of the same scene;
and, when it is determined that the program relates to performing multi-view rendering to render a set of plural images representing plural different views of the same scene, at least one of:

(i) determining whether the program includes a processing operation that can be performed only once for the set of plural views of the scene that are being rendered; and when it is determined that the program includes a processing operation that can be performed only once for the set of plural views of the scene that are being rendered, including in a program to be executed by the programmable processing stage of the graphics processing pipeline, a sequence of at least one graphics program instruction that when executed will cause the programmable processing stage of the graphics processing pipeline to perform that processing operation for a work item once for the set of plural views of the scene that are being rendered and to provide only a single output value for a work item for that processing operation for the set of views; and (ii) determining whether the program includes a processing operation that should be performed separately for each view of the set of plural views of the scene that are being rendered; and when it is determined that the program includes a processing operation that should be performed separately for each view of the set of plural views of the scene that are being rendered, including in the program to be executed by the programmable processing stage of the graphics processing pipeline, a sequence of at least one graphics program instruction that when executed will cause the programmable processing stage of the graphics processing pipeline to perform that processing operation for a work item separately for each view of the set of plural views of the scene that are being rendered, so as to provide a separate output value for a work item for that processing operation for each view of the set of views;

the method further comprising:

providing the program to the graphics processing pipeline for execution; and the programmable processing stage of the graphics processing pipeline when it is to perform processing operations for work items to be processed for the set of plural views to be rendered, executing the program once for each work item to be processed;

wherein the executing the program for a work item comprises, in response to the instructions in the program, at least one of:

(i) when the program provided to the graphics processing pipeline for execution comprises a sequence of at least one graphics program instruction that when executed will cause the programmable processing stage of the graphics processing pipeline to perform a processing operation for a work item once for the set of plural views of the scene that are being rendered and to provide only a single output value for a work item for that processing operation for the set of views, performing that processing operation for the work item once for the set of plural views of the scene that are being rendered and providing only a single output value for the work item for that processing operation for the set of views; and (ii) when the program provided to the graphics processing pipeline for execution comprises a sequence of at least one graphics program instruction that when executed will cause the programmable processing stage of the graphics processing pipeline to perform a processing operation for a work item separately for each view of the set of plural views of the scene that are being rendered, so as to provide a separate output value for a work item for that processing operation for each view of the set of views, performing that processing operation for the work item separately for each view of the set of plural views, so as to provide a separate output value for that processing operation for the work item for each view of the set of plural views that are being rendered.

* * * * *